United States Patent
Tsuzuki et al.

(10) Patent No.: US 6,388,716 B1
(45) Date of Patent: May 14, 2002

(54) AUTOMATIC BRIGHTNESS CORRECTION APPARATUS FOR IMAGE DISPLAY DEVICE

(75) Inventors: Yoshiji Tsuzuki; Masanori Fujiwara, both of Saitama-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/221,171

(22) Filed: Dec. 28, 1998

(30) Foreign Application Priority Data

Dec. 25, 1997 (JP) .............................. 9-358045

(51) Int. Cl.[7] .............................................. H04N 5/57
(52) U.S. Cl. ..................... 348/687; 348/673; 348/181; 348/180
(58) Field of Search ................. 348/687, 688, 348/678, 673, 674, 671, 603, 180, 181, 254, 255, 655, 657, 658, 189, 190, 191, 705; 345/147, 690; H04N 5/57

(56) References Cited

U.S. PATENT DOCUMENTS

| | | | | |
|---|---|---|---|---|
| 4,340,904 A | * | 7/1982 | Wingrove, Jr. .............. 348/657 |
| 4,547,797 A | * | 10/1985 | Mick .......................... 348/655 |
| 4,742,387 A | * | 5/1988 | Oshima ....................... 348/658 |
| 5,270,817 A | * | 12/1993 | Hayashi et al. ............. 348/474 |
| 5,287,176 A | * | 2/1994 | Stolle et al. ............... 378/98.7 |
| 5,546,134 A | * | 8/1996 | Lee ............................. 348/673 |
| 5,596,375 A | * | 1/1997 | Kwon ......................... 348/687 |
| 5,739,871 A | * | 4/1998 | Kim ........................... 348/674 |
| 5,956,014 A | * | 9/1999 | Kuriyama et al. .......... 345/147 |
| 5,969,709 A | * | 10/1999 | Kim ........................... 345/147 |
| 6,072,540 A | * | 6/2000 | Park ............................ 348/687 |

* cited by examiner

Primary Examiner—Wendy R. Garber
Assistant Examiner—Jean W. Désir
(74) Attorney, Agent, or Firm—Pillsbury Winthrop LLP

(57) ABSTRACT

An automatic brightness correction apparatus for automatically correcting the brightness property of the image display device is configured to insert a test pulse at a predetermined level within a level range including an intermediate level to the video signal and displays the image of the test pulse on the video image display device, detect a deviation of the brightness of the image of the test pulse displayed on the video image display device from a benchmark, and correct the level of the video signal based on the detected deviation.

12 Claims, 15 Drawing Sheets

AUTOMATIC BRIGHTNESS CORRECTION APPARATUS FOR IMAGE DISPLAY DEVICE

FIELD OF THE INVENTION

The present invention relates to an automatic brightness correction apparatus for automatically corrects the brightness property of the image display device.

BACKGROUND OF THE INVENTION

Conventionally an automatic brightness correction apparatus was mainly used for balancing R, G and B colors, i.e., three primary colors—red (R), green (G), blue (B). Accordingly, it had a system for adjusting the gain by detecting the brightness levels at the time that the black level images for the R, G and B color signals have been displayed, respectively.

An example of the automatic brightness correction apparatus for correcting the brightness property of image display devices is discussed in the "NHK Television Technical Textbook, Vol. 1, 7.3.1(2), Chapter; Automatic White Balance Circuit," published by NHK (*Nihon House Kyoukai*; Japanese Broadcast Association).

In such a conventional automatic brightness correction apparatus, since it correct by detecting only the lowest level (black level) and the highest level (white level) of the video signal, it could not correct brightness property at the intermediate level in detail.

Here, in the case of general color CRT (cathode-ray tube) three electron guns for displaying respective images of the R, G and B color signals are mounted in one CRT. While the efficiency of each electron gun is deteriorated with the passage of time. Further, the degrees of the efficiency deterioration vary among the electron guns. Accordingly, while the conventional R, G and B color balance correction system is able to ensure the balances at the black level and the white level, it fails to ensure a color balance at an intermediate level.

In the general NTSC TV, since it has a lower resolution, and it displays mainly the moving image, an unbalance of the R, G and B colors at the intermediate level is unobtrusive for viewers and thus not become controversial. However, in the high definition monitor such as for the medical treatment, since it displays the high definition still image a color unbalance of the R, G and B electric guns will become controversial.

Further, in different from the general color CRT a single electron gun type CRT is free from such an R, G and B color unbalance problem. However, the brightness property at an intermediate level is apt to deteriorate from its initial property with the passage of time. Such a case will be the problem in the monitor requiring high-performance brightness property at the intermediate level such as the high definition monitor such as for the medical treatment.

Furthermore, in the multi-screen display device which displays fractions of one image on a number of CRTs in a multi-CRT display device, the images will be hard to see when there is an unbalance between brightness of adjacent CRTs. So, in the conventional system the brightness properties at the black level and the white level are kept equal for every CRT. However, since the brightness properties of CRTs at the intermediate levels may gradually account for differences with the passage of time the image and thus becomes hard to be viewed for viewers.

In the conventional automatic brightness correction apparatus mentioned above, since it detects and corrects the brightness at only the lowest level (black level) and the highest level (white level) of the image signal, it can not correct the brightness at the intermediate level, so that it generates the image deterioration such as the unbalance of the R, G and B colors at the intermediate level because of the deterioration of the efficiency of electron guns with the passage of time.

SUMMARY OF THE INVENTION

It is, therefore, an object of the present invention is to provide an automatic brightness correction apparatus which performs the highly accurate automatic brightness correction for the intermediate level image signals.

In order to achieve the above object, an automatic brightness correction apparatus for automatically correcting the brightness property of the image display device according to one aspect of the present invention is configured to insert a test pulse at a predetermined level within a level range including an intermediate level to the video signal and displays the image of the test pulse on the video image display device, detect a deviation of the brightness of the image of the test pulse displayed on the video image display device from a benchmark, and correct the level of the video signal based on the detected deviation.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 1 through 16.

Figure 1:
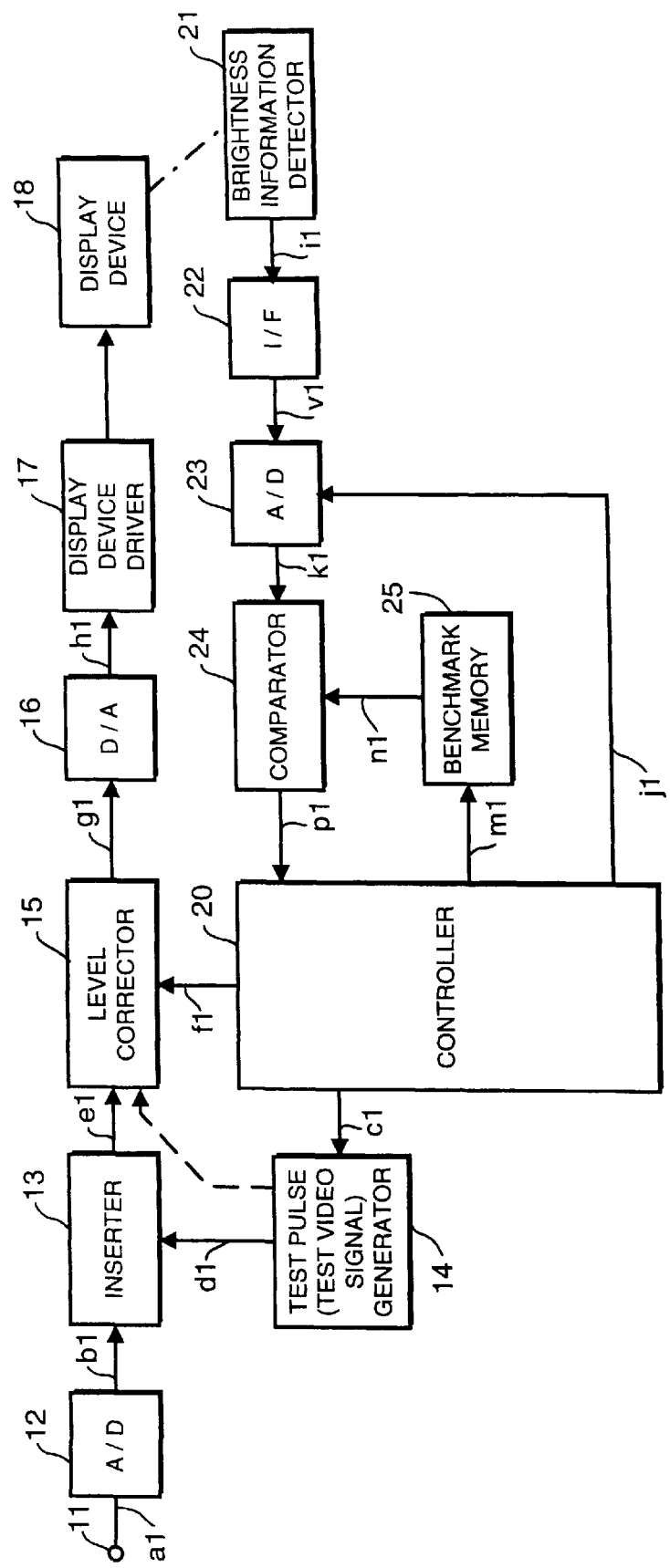
FIG. 1 is a block diagram showing the basic concept of the first embodiment of the automatic brightness correction apparatus according to the present invention.

FIG. 1 is a block diagram showing a basic configuration of the first embodiment of the automatic brightness correction apparatus according to the present invention.

In FIG. 1, an automatic brightness correction apparatus for automatically correcting the brightness property of the image display device is configured to insert a test pulse at a predetermined level including an intermediate level to the video signal and displays them on the video image display device, detects the aberration of the brightness of the test pulse's image displayed on the video image display device from the benchmark, and corrects the level of the video signals based on the detected result.

A reference numeral 11 denotes a video signal input terminal to which a base-band video signal a1 is lead from a television receiver tuner/demodulator or a video tape recorder. The video signal a1 lead to the video signal input terminal 11 is supplied to an analog/digital (hereinafter referred to A/D) converter 12. The A/D converter 12 converts the video signal a1 to a digital video signal b1 and supplies it to an inserter 13.

On the other hand, a test pulse generator 14 supplies a digital test pulse d1 whose signal level is controlled to the inserter 13 based on a control signal c1 supplied from a controller 20.

The inserter 13 inserts the digital test pulse d1 supplied from the test pulse generator 14 to the specific position of the video signal a1 supplied from the A/D converter 12, and leads the inserted signal, i.e., a digital video signal e1 to a level corrector 15.

The level corrector 15 is possible to revise the correction value based on a control signal f1 supplied from the controller 20, corrects every level of the digital video signal e1 supplied from the inserter 13, and supplies a corrected digital video signal g1 to a digital/analog (hereinafter referred to D/A) converter 16.

The D/A converter 16 converts the digital video signal g1 supplied from the level corrector 15 into an analog video signal h1 and supplies it to a video image display device driver 17.

The video image display device driver 17 drives a video image display device 18 by the supplied analog video signal h1 and displays the analog video signal h1 on the video image display device 18.

A brightness information detector 21 detects the brightness of the test pulse's image displayed by the video image display device 18, converts the detection result into a brightness information signal i1, and supplies it to an interface (hereinafter referred to as I/F) 22. The I/F 22 converts the brightness information signal i1 into its correspondence voltage v1 and supplies it to an A/D converter 23. The A/D converter 23 controlled by a control signal j1 supplied from the controller 20 generates a digital brightness information signal k1 by performing the A/D conversion to the voltage signal V1 supplied from the I/F 22 and supplies it to a comparator 24.

A benchmark memory 25 is storing the benchmarks pertinent to the test pulse at a predetermined level including the intermediate level of the video signal. The benchmark memory 25 reads out the benchmark data n1 based on a read control signal m1 supplied from the controller 20 and supplies it to the comparator 24.

The comparator 24 compares the digital brightness information signal k1 supplied from the A/D converter 23 and a benchmark data n1 supplied from the benchmark memory 25, and supplies the digital data p1 of the comparison result to the controller 20.

The controller 20 controls the test pulse generator 14 to output the digital test pulse at a level variable in a level range including an intermediate level using the control signal c1. Then the controller 20 supplied the control signal j1 to the A/D converter 23 for activating the A/D conversion of the A/D converter 23 at the timing that the level of the test pulse generated in the test pulse generator 14 is detected in the brightness information detector 21 and then the voltage signal V1 is output from the I/F 22. The controller 20 also supplies the control signal m1 to the benchmark memory 25 at that time for activating the benchmark memory 25 to output the benchmark data n1 pertinent to the test pulse supplied from the test pulse generator 14. Accordingly in the case that the comparison result p1 obtained from the comparator 24 exhibits any difference, the controller 20 supplies the control signal f1 to the level corrector 15 for revising the correction value.

According to such a construction mentioned above, the A/D converter 12 operates to convert the analog video signal a1 to the digital video signal b1. The test pulse generator 14 operates to generate the digital test pulse d1 at a predetermined level within the level range including the intermediate level. The inserter 13 operates to insert the digital test pulse d1 supplied from the test pulse generator 14 on the specific position of the digital video signal b1 supplied from the first A/D converter 12. The level corrector 15 operates to correct the level of the digital video signal e1 supplied from the inserter 13. The D/A converter 16 operates to convert the digital video signal g1 supplied from the level corrector to the analog video signal. The brightness information detector 21 and the I/F 22 operate to detect the brightness level of the video image display device driven by the test pulse supplied from the D/A converter 16. The I/F 22 operates to converts the detected brightness level from the current mode to the voltage mode. The A/D converter 23 operates to convert the brightness information signal supplied from the brightness information detector to the digital brightness information signal. The benchmark memory 25 operates to store the benchmark data. The controller 20 operates to selectively read out a benchmark data pertinent to the test pulse supplied from the benchmark memory. The comparator 24 operates to compare the digital brightness information signal k1 supplied from the second A/D converter and the benchmark data n1 selected in the benchmark selector. Further, the controller 20 revises the correction value pertinent to the test pulse in the level corrector based on the comparison result of the comparator 24.

The operation of the embodiment of the invention will be explained hereinafter. The controller 20 controls the test pulse generator 14 to generates a test pulse at a first level within a number (N) of digital test pulses at a variety of levels including the intermediate level. In this case, the test pulse at the first level is corrected by the correcting value pertinent to the first level in the level corrector 15, then displayed in the video image display device 18. The test pulse's image displayed in the video image display device 18 is detected in the brightness information detector 21, compared with the benchmark data n1 supplied from the benchmark memory 25 in the comparator 24 via the I/F 22 and the A/D converter 23. The controller 20 controls the level corrector 15 to revise the correction value pertinent to the first level so as to eliminate the difference represented by the comparison result p1. The same revision of the correction values will be made for the test pulses at the variety of levels extending from the second level to the N level in the level corrector 15.

As mentioned above, since the controller 20 controls the level corrector 15 to correct the correction value, so that the deviations of the number of (N) test pulses at the levels extending over the level range including the intermediate level from the benchmark level data will be eliminated, it can performs a high-efficient automatic brightness correction to the video signal at a variety of levels including the intermediate level.

Figure 2:
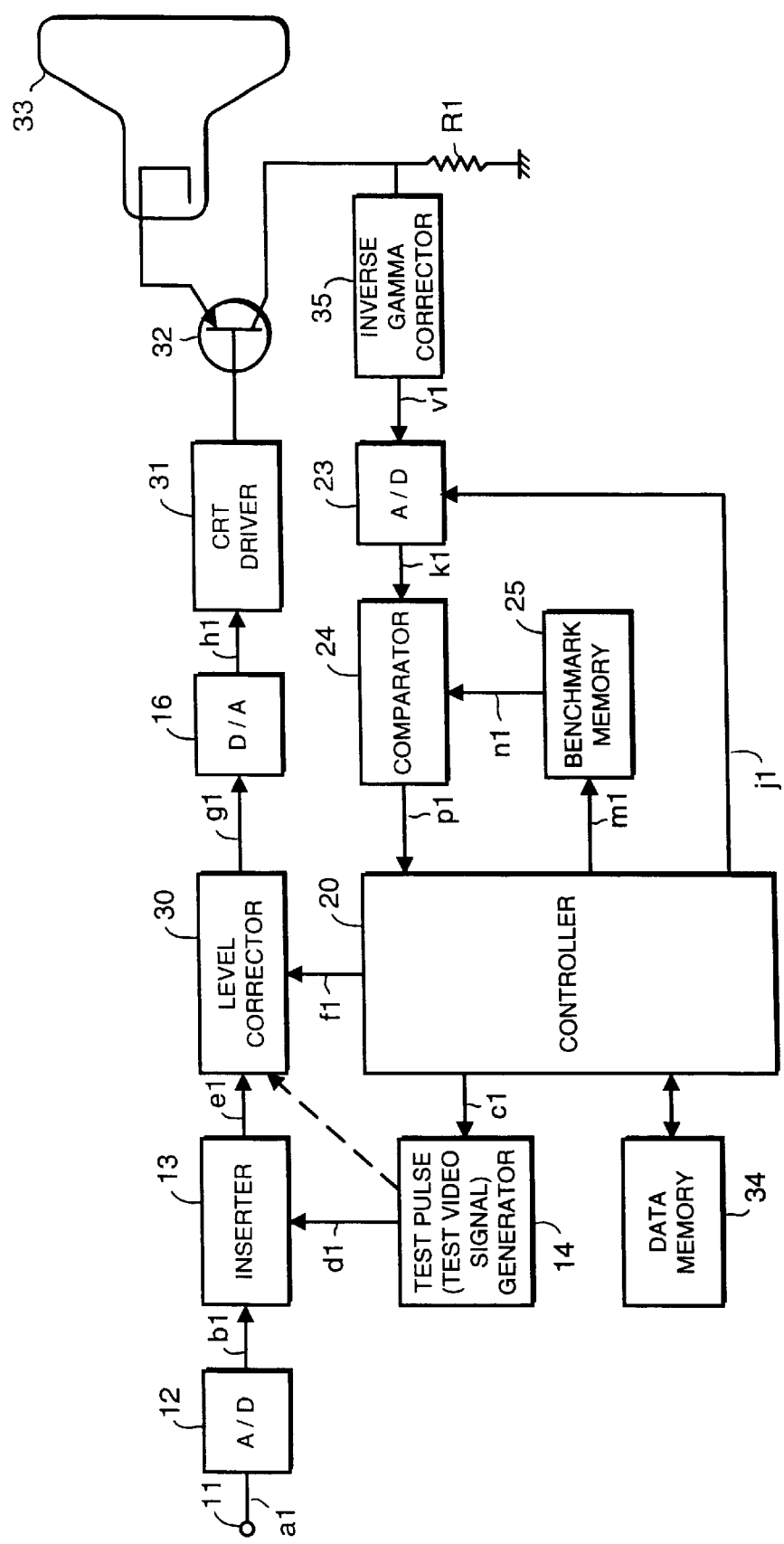
FIG. 2 is a block diagram showing the case that the embodiment shown in FIG. 1 is applied to the video image display device using the CRT of electron guns.

FIG. 2 is a block diagram showing the case that the embodiment of the present invention, as shown in FIG. 1, is applied to the video image display device using the CRT of the simple electron guns. The same components as those, as shown in FIG. 1 are assigned with the same reference numerals.

In FIG. 2, a look up table memory (hereinafter referred to as LUT memory) 30 corresponds to the level corrector 15, as shown in FIG. 1. A cathode ray tube (hereinafter referred to CRT) driver 31 corresponds to the video image display device driver 17. A CRT 33 corresponds to the video image display device 18. Further, a cathode current detection transistor 32 and a corrector resistor R1 correspond to the brightness information detector 21 and the I/F 22 in FIG. 1, respectively.

The output terminal of the CRT driver 31 is connected to the base of the cathode current detection transistor 32. The cathode of the CRT 33 is connected to the basic electric point via the series connection of the emitter collector of the cathode current detection transistor 32 and the corrector resistor R1. The connecting point of the corrector path of the cathode current detection transistor 32 and the corrector resistor R1 is connected to the input terminal of the A/D converter 23.

Further, in the embodiment of the present invention, since the LUT memory 30 is the volatile memory, a non-volatile memory 34 is connected to the controller 20 to keep the value of the LUT memory 30 at the power off time.

The operation of such a video image display device will be explained hereinafter.

The video signal a1 supplied through the input terminal 11 is converted into the digital video signal b1 first in the A/D converter 12. To the digital video signal b1, the digital test pulse d1 is inserted in the vertical retrace line interval (not shown) in the inserter 13. In this case, the inserter 13 may be replaced by a switch which establishes a connection to the test pulse generator 14 at the time of timing to insert the digital test pulse d1, while establishes a connection to the A/D converter 12 at other times.

The digital test pulse d1, which is thought in the analog signal state, is revised in turn in every vertical retrace line interval, and it's pulse width is for instance the horizontal scanning period. For instance, if the A/D converter 12 is 8 bit resolution, the lowest level (black level) and the highest level (white level) of the digital video signal will be given as 0 and 255 in digital level. Accordingly, the test pulse will rise by 1 in every vertical scanning period. Here assuming that J is an arbitrary integer, the test pulse has the levels 0, 1, and 255 in digital level in the J-th, (J+1)-th and (J+255)-th vertical scanning periods. The digital pulse then returns 0 in digital level in the (J+256)-th vertical scanning period. The timing revise and the value setup are controlled by the controller 20.

The video signal to which the test pulse is inserted is corrected the level in the LUT memory 30.

The LUT memory 30 provides the corrected value which is defined according to the value of digital video signal e1 input in the volatile memory of high speed. For instance, if the A/D converter 12 has the 8 bit resolution, the video signal will be from 0 to 255 in digital level. The digital video signal e1 is input to an address terminal of the LUT memory 30. That is, when the digital video signal e1 is 0 in digital level the value stored in the LUT memory 30 at the address 0 is selected to be output, in the same way, when the video signal is M (M=0, 1, 2, 3, ..., 255) in digital level, the value stored in the LUT memory 30 at the address M is selected. When the data stored in the LUT memory 30 are 8 bit resolution, if the stored value at an address K (K=0, 1, 2, 3, ..., 255) is kept to K in digital level, the input video signal passes through the LUT memory 30 without receiving any correction. So that, the video signal is arbitrarily corrected by controlling the relation between the address and the value to be stored. Since the number of the data stored in the LUT memory 30 is enough to extend over the values from 0 to 255 in digital level of the input video signal, the number of data may be 256 units in the embodiment of the present invention.

The video signal whose level is corrected using the LUT memory 30 is then performed the analog signal conversion in the D/A converter 16, and applied to the cathode of the CRT 33 via the conventional CRT driver 31 and the cathode current detection transistor 32.

The CRT 33 displays the image of the video signal applied to the cathode, so that a cathode current flows in accordance with the brightness of the displayed image. Since the cathode current is generally in proportion to the brightness, the brightness property of the cathode can be recognized by detecting the cathode current. The cathode current is converted into the voltage signal V by flowing from the cathode current detection transistor 32 to the resistor R1, ten converted into the digital brightness information signal k1 in the A/D converter 23. At that time, the A/D converter 23 is controlled by the controller 20 to convert only the cathode current which the test pulse inserted in the vertical retrace line interval drives the CRT 33.

The cathode current of the test pulse converted into the digital brightness information signal k1 is supplied to the comparator 24.

A benchmark pertinent to the test pulse cathode current which is compared at present by the controller 20 is selectively read out from the benchmark memory 25. In the benchmark memory 25, which is a non-volatile memory, the test pulse cathode current which is in the excellent video image display condition in advance is stored. The number of the stored data may be the same as the test pulse that may be 256 in the embodiment of the present invention.

Further, since the controller 20 controls the test pulse generator 14, it reads the value of the present test pulse, so that it is easy to select the corresponding benchmark by controlling the benchmark memory 25.

The data memory 34, which is the non-volatile memory, keeps the same value as the LUT memory 30 all the time. Since the LUT memory is required the high speed to perform the level revise of the digital video signal e1 at real time, it must be the volatile memory of high speed. So, the value of the data memory 34 is transmitted to the LUT memory 30 by the controller 20 at the power on time, and when the data in the LUT memory 30 is revised based on the comparison result supplied from the comparator 24, the value of the corresponding data memory 34 is also revised. Here, if there is the non-volatile memory of the high speed in case of course, the data memory 34 will be useless. Further, the number of the stored data, which is the same as that of the LUT memory 30, may be 256.

The address to be revised of the LUT memory 30 is that showing the compared test pulse value. For instance, if the A/D converter 12 is 8 bit resolution, and the present test pulse is 0 in digital level, the test pulse is converted into the stored value at the address 0 in the LUT memory 30 as mentioned above. The stored value at the address 0 becomes the cathode current by applied to the cathode of the CRT 33, then is compared with the benchmark by the benchmark data n1 in the comparator 24. For instance, according to the comparison result, when the cathode current is greater than the benchmark, it will be lowered by reducing the stored value in the LUT memory 30 at the address 0, which is read out from the data memory 34 by the controller 20 by 1 in digital level to be written in the data memory 34 again, at the same time, the same value is written into the LUT memory 30 at the address 0. By repeating the operation, the cathode current converges on the benchmark, then finally it will be the same as the benchmark. Here if the value had increased or decreased by ones, it disadvantageously takes a long time of convergence. So, for instance, if a difference value, i.e., the comparison result output from the comparator 24 is relatively large, the step of the increase or the decrease is made large. While if the difference value is relatively small, the step of the increase or the decrease is made small.

Accordingly, the stored values in the LUT memory 30 and the data memory 34 are revised so that over the test pulses 0 to 255 in digital level all the cathode currents match with their corresponding benchmarks.

In the CRT 33, even though the signal level supplied to the cathode is not revised, the brightness lowers with the passage of time, so that the cathode current is also decreased. When the cathode current lowers, it causes the difference from the benchmark memorized in the benchmark memory 25. So, the value of the LUT memory 30 is revised to make the cathode current same as the benchmark, accordingly, it can prevent the brightness from decrease with the passage of time.

Further, in the embodiment of the present invention, by compared the cathode current with the benchmark digitally, since the signal is converted in the LUT memory 30 it can correct more accurate than the analog system.

According to the present invention, it can prevent the brightness revise with the passage of time over the full level range of the video signal including the intermediate level.

Figure 3:
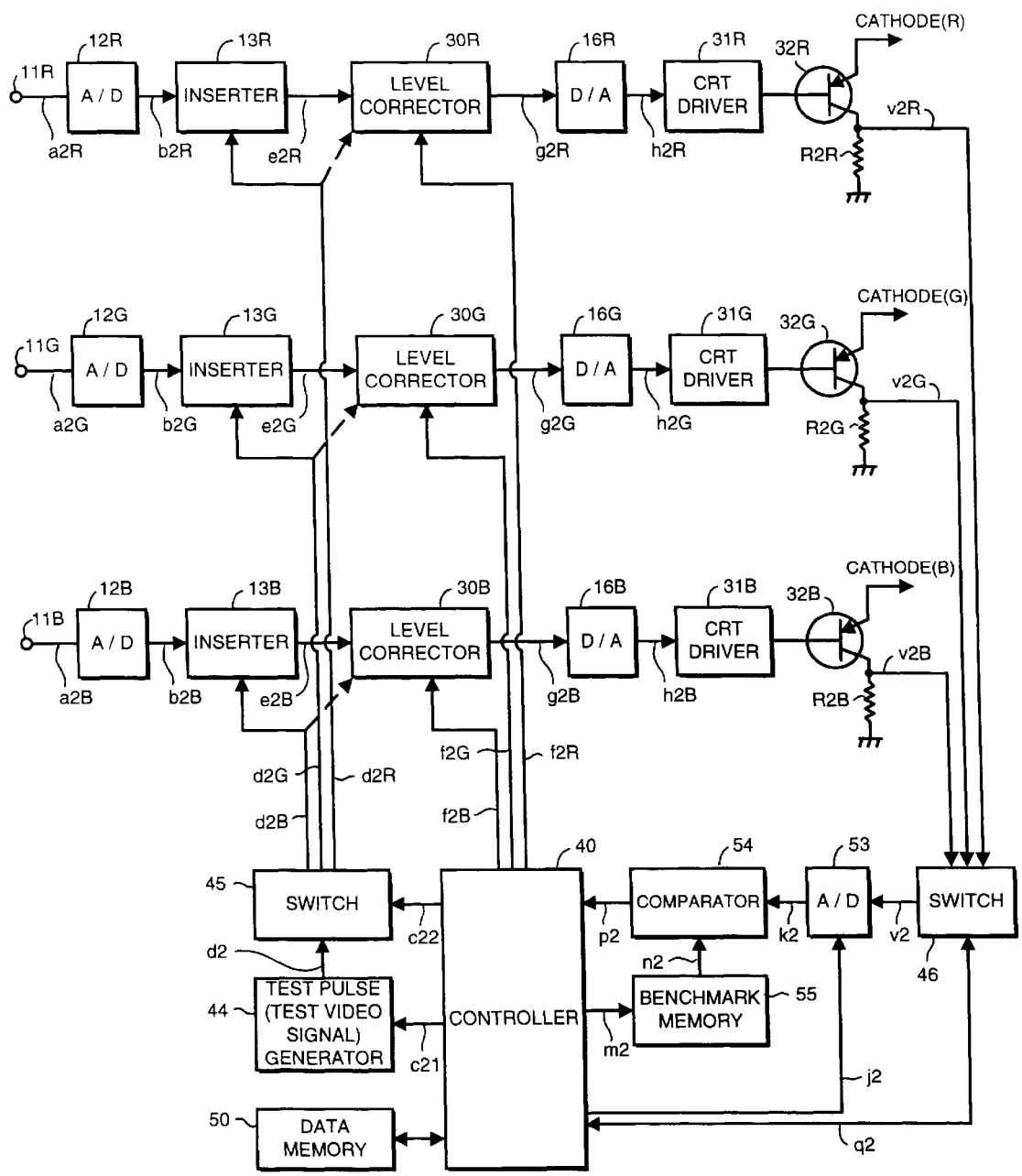
FIG. 3 is a block diagram showing the second embodiment of the automatic brightness correction apparatus according to the present invention.

FIG. 3 is a block diagram showing the second embodiment of the automatic brightness correction apparatus according to the present invention, which is applied to the video image display device using the color CRT of three electron guns such as red (R), green (G), and blue (B).

In FIG. 3, reference numerals 11R, 11G and 11B denotes video signal input terminals to which the video signals a 2R, a2G, and a2B of red (R), green (G), and blue (B) generated from the base-band video signal obtained in the television receiver tuner/demodulator or the video tape recorder. The video signals a2R, a2G, and a2B lead to the video signal input terminals 11R, 11G and 11B are supplied to A/D converters 12R, 12G and 12B, respectively. The A/D converters 12R, 12G, and 12B perform the A/D conversion to the supplied video signals a2R, a2G, and a2B of the R, G and B colors, then generate digital video signals b2R, b2G, and b2B of the R, G and B colors, and supply them to inserters 13R, 13G, and 13B.

On the other hand, a test pulse generator 44 supplies a digital test pulse d2 whose signal level is controlled to a switch 45 based on a control signal c21 supplied from the controller 40. In this case, the test pulse generator 14, as shown in FIG. 2 outputs only the digital test pulse d1 for the horizontal scanning period in the vertical scanning period, however, the test pulse generator 44 outputs the digital test pulse d2 for three horizontal scanning period in the period vertical scanning period. The switch 45 revises the digital test pulse d2 in the horizontal scanning period in turn since the R, G and B color signals are inserted on different positions shifted by the horizontal scanning period based on a control signal c22 supplied from the controller 40, then supplies them to the inserters 13R, 13G, and 13B as digital test pulse d2R, d2G, and d2B.

The inserters 13R, 13G and 13B insert the digital test pulses d2R, d2G, and d2B supplied from the switch 45 in the specific positions of the digital video signals b2R, b2G, and b2B supplied from the A/D converters 12R, 12G, and 12B. Then it leads them to the LUT memories 30R, 30G, and 30B as digital video signals e2R, e2G, and e2B.

The LUT memories 30R, 30G, and 30B, for instance, outputs the corrected value setup according to the values of digital video signals e2R, e2G, and e2B which are input by the high speed volatile memory. That is, the LUT memories 30R, 30G 30B, which can revise the correction value based on control signals f2R, f2G, and f2B supplied from the controller 40, correct every level of the digital video signals e2R, e2G, and e2B supplied from the inserters 13R, 13G, and 13B, and supply them to D/A converters 16R, 16G, and 16B as digital video signals g2R, g2G, g2B.

The D/A converters 16R, 16G, and 16B convert the digital video signals g2R, g2G, and g2B supplied from the LUT memories 30R, 30G, and 30B into analog video signals h2R, h2G, and h2B. Then they supply these signals to the CRT drivers 31R, 31G, and 31B.

The output terminals of the CRT drivers 31R, 31G, and 31B are connected to the bases of cathode current detection transistors 32R, 32G, and 32B. The cathode R, cathode G, and cathode B of the R, G and B color electron guns in the CRT are connected to the reference potential source via the series connection of the emitter collector of the cathode current detection transistors 32R, 32G, and 32b and corrector resistors R2R, R2G, and R2B. The connections of the collectors of the cathode current detection transistors 32R, 32G, and 32B and the collector resistors R2r, R2G, and R2B are also connected with the first through third input terminals of a switch 46.

The CRT drivers 31R, 31G, and 31B perform the analog signal conversion to the digital video signal g2R, g2G, and g2B supplied from the D/A converters 16R, 16G, and 16B, then apply them to the CRT cathode R, cathode G, and cathode B via the cathode current detection transistors 32R, 32G, and 32B.

The CRT displays an image corresponding to the video signals applied to the cathode R, cathode G, and cathode B.

At that time cathode currents defined by the video signals and brightness properties of the R, G and B cathodes flow therethrough. The cathode currents flow through the cathode current detection transistors 32R, 32G, and 32B and resistors R2R, R2G and R2B, and wherein they are converted into voltages V2R, V2G and V2B to be supplied to the switch 46.

The switch 46 selects the voltage signals V2R, V2G, and V2B, which have been converted from the R, G and B cathode currents of a CRT, in steps of the horizontal retrace line interval for the R, G and B color signals, respectively, in order of the time that the test pulses have been inserted according to the control signal q2 from the controller 40. Then it supplies the selected voltage to an A/D converter 53 as the voltage signal V2. The A/D converter 53 converts the voltage signal V2 into the digital brightness information signal k2.

In this case, the controller 40 controls the A/D converter 53 by the control signal j2 to convert only the cathode current which the R, G and B test pulses inserted on the vertical retrace line interval drives the CRT.

The test pulse cathode current converted into the digital brightness information signal k2 is supplied to a comparator 54.

A benchmark memory 55 stores the number of benchmark data pertinent to the level test pulses for the R, G and B color signals at a plurality of levels including the intermediate level. The benchmark memory 55 provides the benchmark data n2 to the comparator 54 based on the read control signal m2 from the controller 40.

The comparator 54 compares the digital brightness information signal k2 from the A/D converter 53 and the benchmark memory 55, and supplies the data signal p2 which is the comparison result to the controller 40.

The controller 40 supplies the control signal c21 to the test pulse generator 44 so as to control the test pulse generator 44 to output the digital test pulse of the R, G and B color signals at a predetermined level including the intermediate level. The controller 40 also supplies the control signal c22 to the switch 45 so as to control the switch 45 to divide the digital test pulse d2 of the R, B and G color signals at a predetermined level and to supply the divided digital test pulses to the inserters 13R, 13G and 13B, respectively, as the digital test pulses d2R, d2G, and d2B. Then, the controller 40 controls the switch 46 at the timing that the signal levels of the test pulse generated in the test pulse generator 44 are detected in the resistors R2R, R2G, and R2B and output as the voltage values V2R, V2G, and V2b. Then it supplies the control signal j2 to perform the A/D conversion to the A/D converter 53, at the same time it supplies the read control signal m2 to the benchmark memory 55, which is for outputting the benchmark data pertinent to the test pulse output to the benchmark memory 55 from the test pulse generator 44. Accordingly, in the case that the data signal p2 obtained from the comparator 54 exhibits any difference, the control signals f2R, f2G, and f2B for revising the correction values are supplied to the LUT memories 30R, 30G, and 30B, respectively.

Furthermore, in the embodiment of the present invention, since the LUT memories 30R, 30G, and 30B are the volatile memories, the controller 40 connects the non-volatile memory 50 to keep the values of the LUT memories 30R, 30G, and 30B in the power off state.

The operation of the embodiment according to the present invention will be explained in reference to FIG. 4.

Figure 4:
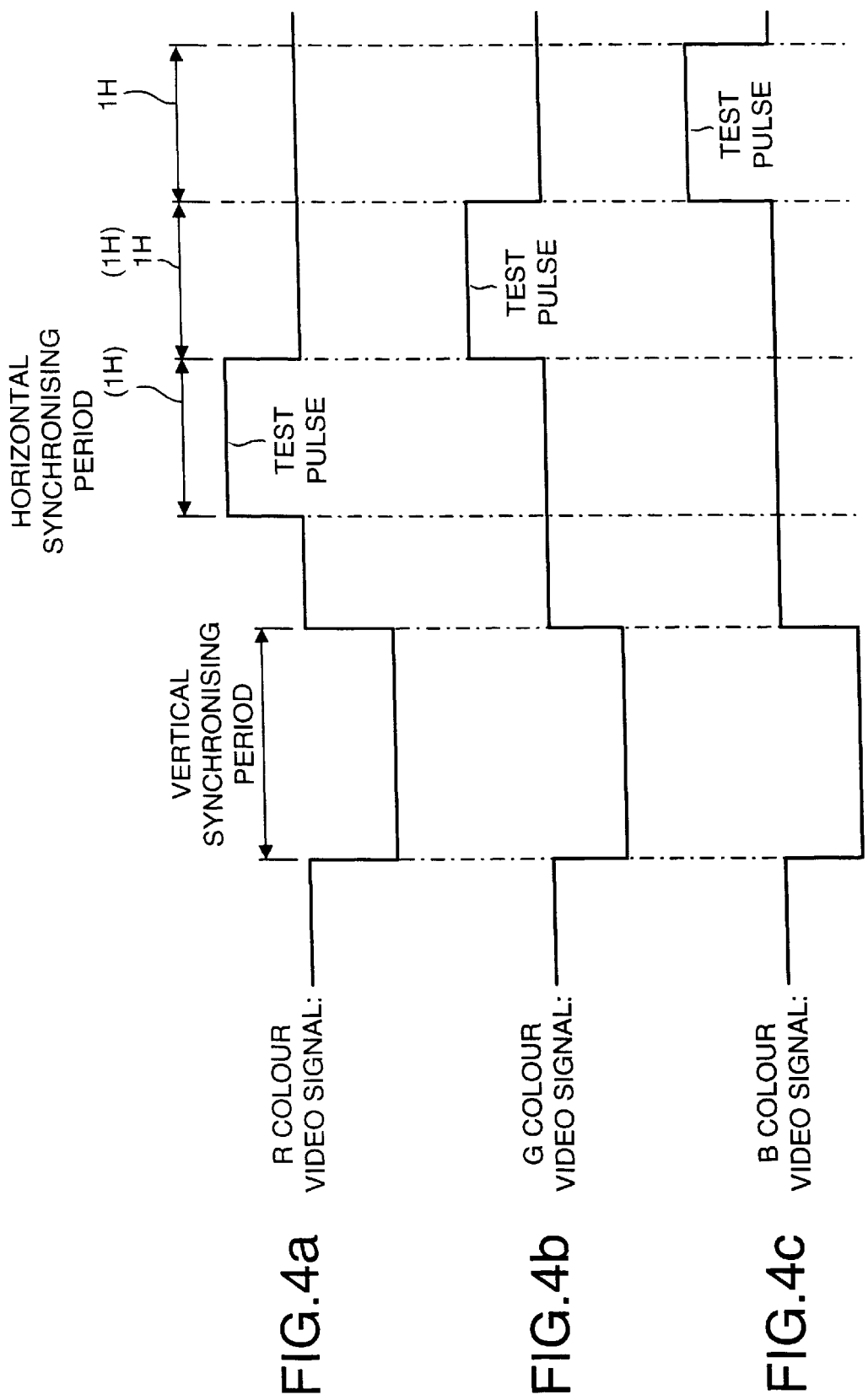
FIG. 4 is a timing chart for explaining the operation of the embodiment of the present invention shown in FIG. 3.

FIG. 4 is a timing chart for explaining the operation of the embodiment of the present invention, as shown in FIG. 3.

FIG. 4a is showing the digital video signal e2R from the inserter 13R as analog R video signal. FIG. 4b is showing the digital video signal e2G from the inserter 13G as the analog G video signal. And FIG. 4c is showing the digital video signal e2B from the inserter 13B as the analog B video signal.

As shown in FIGS. 4a, 4b and 4c, the test pulses are inserted on different positions shifted by the horizontal scanning periods for the R, B and G video signals, respectively.

Accordingly, the video signals inserted with the test pulses are corrected their levels in the LUT memories 30R, 30G, and 30B, and then converted to analog signals in the D/A converters 30R, 30G, and 30B. Then the analog video signals are supplied to the R, B and G cathodes of the CRT. In this embodiment of the present invention, detection of the cathode currents of the R, G and B electron guns are performed in steps of the horizontal scanning period for the R, G and B color signals in order of the time that the test pulses have been inserted by using the switch 46.

First, the cathode current of the R video signal test pulse (voltage signal V2) is converted in the A/D converter 53, then compared in the comparator 54. At that time, the benchmark to be compared is that corresponding to the R video signal.

Based on the comparison result, the value pertinent to the R video signal data of the LUT memory 30R and the data memory 50 is revised. The A/D converter 53 then revises the cathode current of the G video signal, and revises the value of the LUT memory 30G. As the same way, it turns to the B video signal. Though the operations are identical to those in the embodiment of the present invention, as shown in FIG. 2, there is a difference that it operates continuously for every horizontal retrace line interval in order of the R, G and B color signals. Since it takes just seconds for performing the digital conversion in the A/D converter 53, comparing in the comparator 54, and altering the data of the LUT memory and of the data memory 50, the horizontal scanning period is enough for completing a series of operations.

Further, in the benchmark memory 55 and the data memory 50 the three style values for the R, G and B color signals are stored. Accordingly, in this embodiment of the present invention, the number of the data will be triple as much as that in the embodiment of the present invention, as shown in FIG. 2. Here, in the benchmark memory 55 only one value can be used for the R, G and B color signals in common.

Furthermore, the controller 40 controls the operation timing of the switches 54 and 45 to revise the values of the LUT memories of the R, G and B color signals or benchmark selections for every scanning retrace line interval.

According to the embodiment explained above, the present invention can be applied to the video image display device using the three electron guns type color CRT, and it keeps the white balance of the R, G and B colors in full brightness levels.

Figure 5:
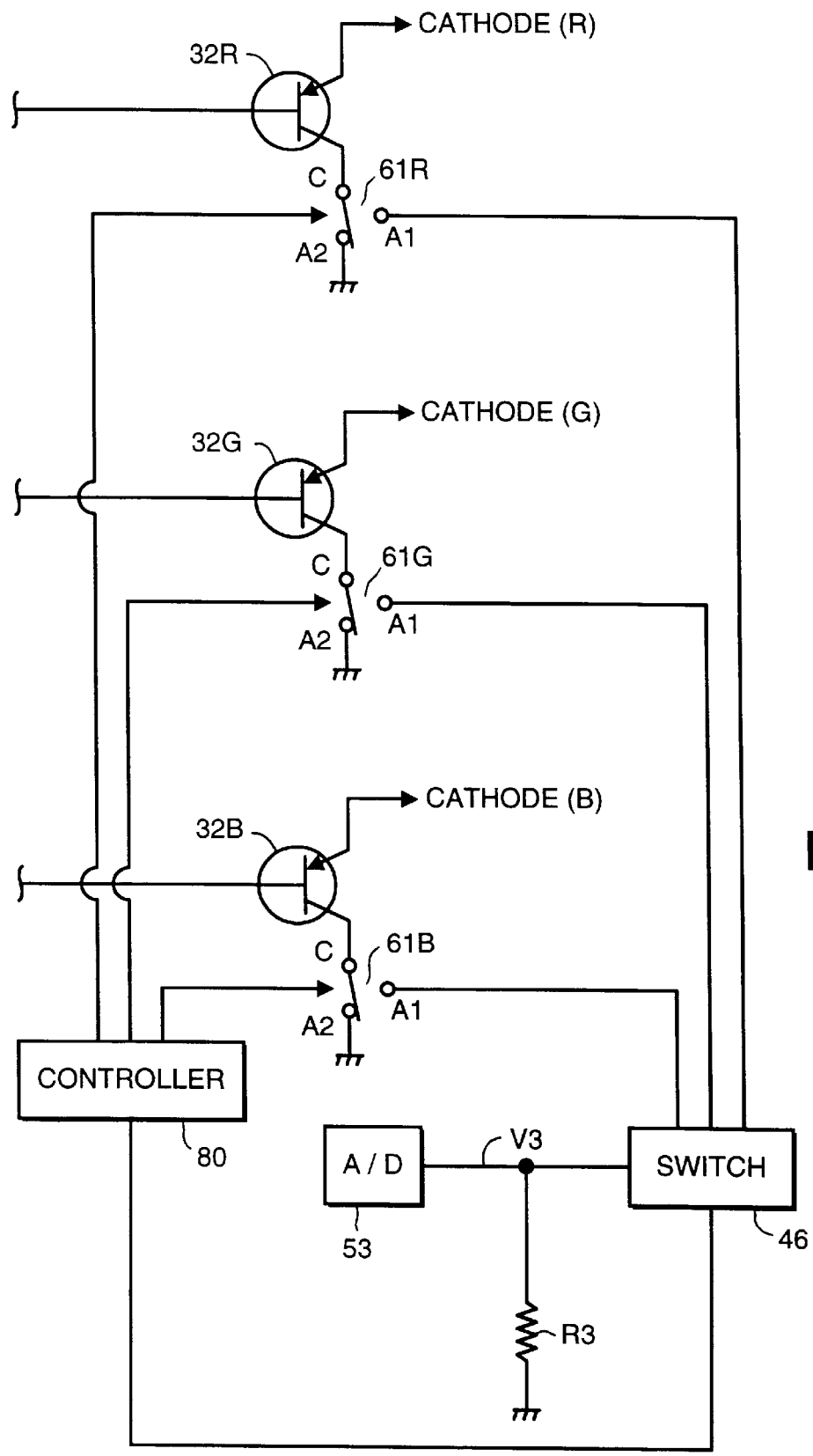
FIG. 5 is a block diagram showing a prime part of a modification of the above embodiment, as shown in FIG. 3.

FIG. 5 is the prime part of a modification of the above embodiment, as shown in FIG. 3.

In FIG. 5, it is provided with switches 61R, 61G, and 61B between the collectors of the cathode current detection transistors 32R, 32G, and 32B and the switch 46, and the collector resistor R3 which is common for the R, G and B color signals on the output side of the switch 46. The controller 60 controls the switch 46 and the switches 61r, 61g and 61B besides the function of the controller 40, as shown in FIG. 3.

Gone into detail, the collectors of the cathode current detection transistors 32R, 32G, and 32B are connected to the common terminal C1 of the switches 61R, 61g, and 61B. Of the switches 61R, 61G, and 61B output terminals A1 are connected to the first and the third terminals of the switch 46 and the other output terminals A2 are connected to the reference potential source. The output terminal of the switch 46 is connected to the reference potential source via the collector resistor R3, and also connected to the input terminal of the A/D converter 53.

The controller 60 controls one of the switches 61R, 61G and 61B through which the current inserted the test pulse from the cathode current detection transistor 32R, 32G and 32B flows to select a connection to the terminal A1, while controls the other switches to select a connection to the terminal a2. The controller 60 also controls the switch 46, so that the common terminal C of one of the switches 61R, 61G and 61B which has selected the connection to the terminal A1 is connected to one end of the collector resistor R3.

Accordingly, the currents supplied from the cathode current detection transistors 32R, 32G, and 32B flow through the collector resistor R3 in the case that the test pulse is inserted, where they are converted into the voltage signal V3, then supplied to the A/D converter 53.

According to such a modification, since it obtains the voltage signal V3 of the test pulse by the collector resistor R3 which is common to the R, G and B color signals, it can prevent the dispersion of the voltage signals caused by the resistance of the resistor.

Figure 6:
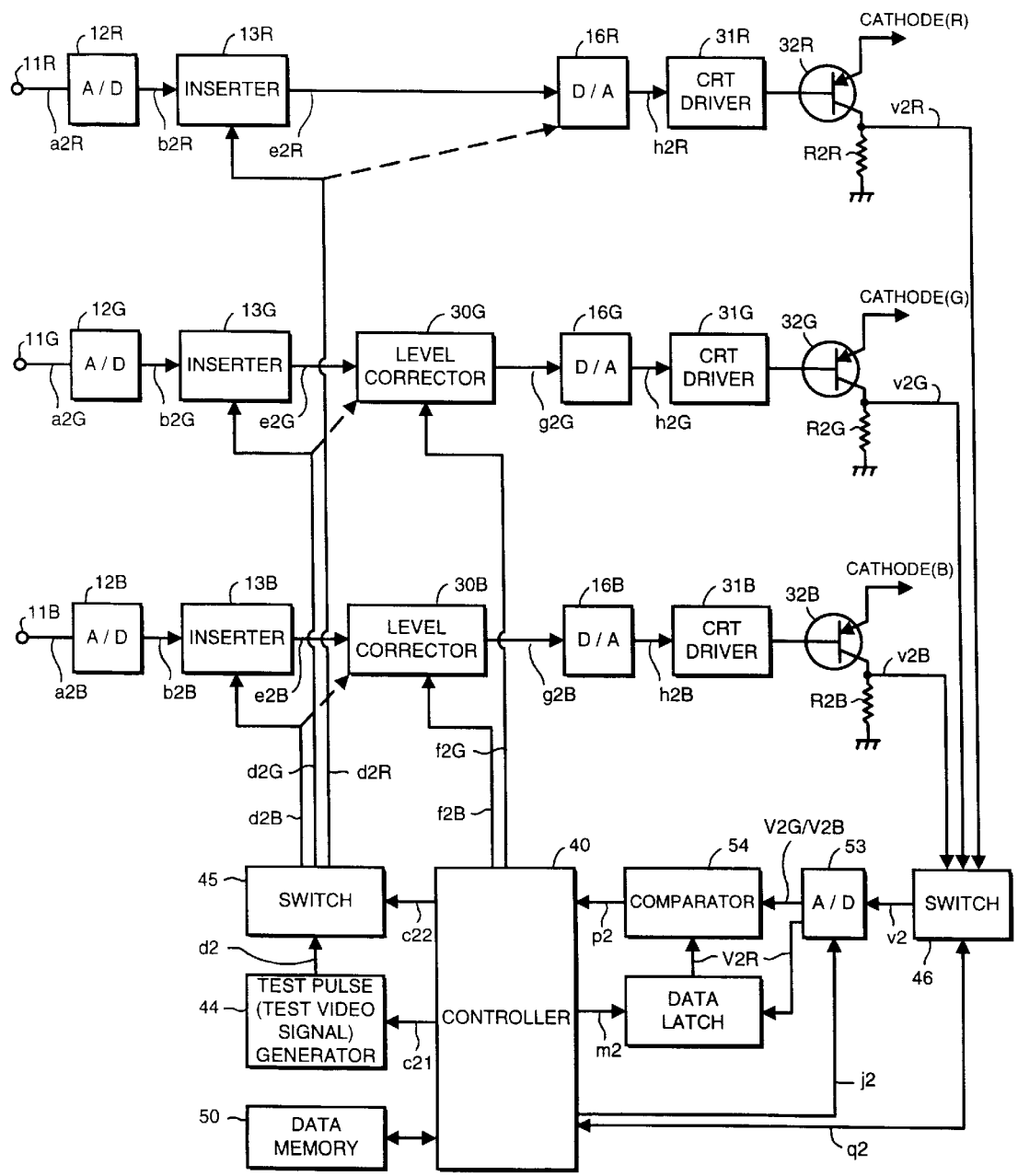
FIG. 6 is a block diagram showing a modification of the embodiment, as shown in FIG. 3.

Referring now to FIG. 6, a modification which allows degradations of brightness properties of three electron guns in a three electron gun type color CRT, but eliminates only the brightness unbalance among three electron guns, by taking, for example, the brightness information signal V2R as a benchmark. In FIG. 6, the controller 40 controls a data latch 55-2 to latch only the brightness information signal V2R supplied from A/D converter 53. The comparator 54 compares two other brightness information signals V2G and V2B with the brightness information signal V2R latched as the benchmark in the data latch 55-2. Then the controller 40 controls the revisions of correction levels in the level correctors 30G and 30B in the manner the same as that in the embodiment of FIG. 3, based on these comparison results. Then G and B color signals to be supplied to the electron gun 33G and 33B are so controlled that their brightness levels coincide with the R color signal supplied to the electron gun 33R. And thus the three electron guns 33R, 33G and 33B become to exhibit the same brightness property. According to the above embodiment, the R color channel does not need a level corrector. As described above, in such a display device of the three electron gun type color CRT which is enough to eliminate only the brightness unbalance among three electron guns, it is also able to provide a favorable image display without the brightness unbalance of the three electron guns in extending over the whole level range including the intermediate level, if removing the benchmark memory and one of three level correctors.

Figure 7:
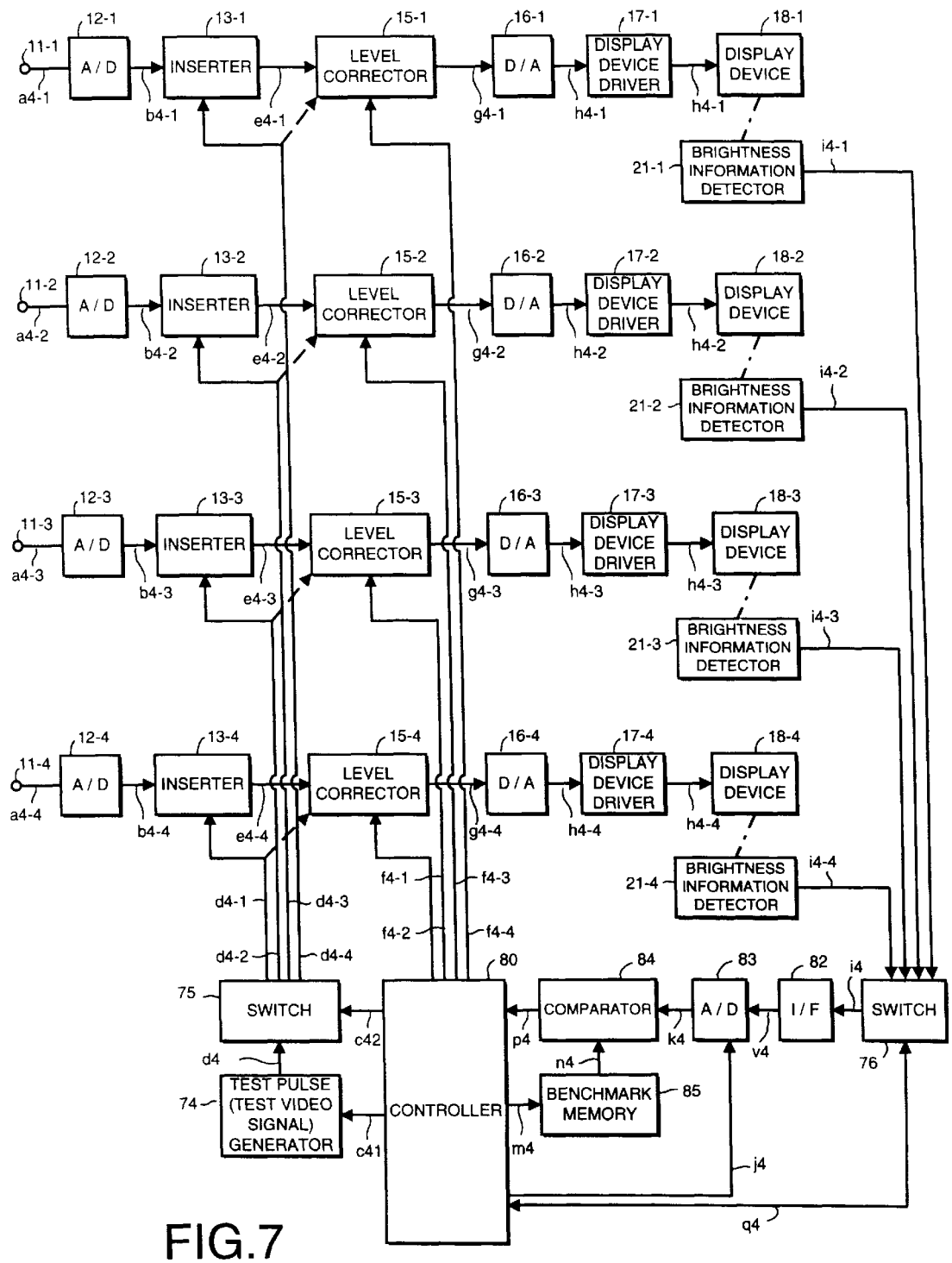
FIG. 7 is a block diagram showing the third embodiment of the automatic brightness correction apparatus according to the present invention.

FIG. 7 is a block diagram showing the third embodiment of the automatic brightness correction apparatus according to the present invention, which is adapted for a multi-CRT type image display device using a plurality of CRT devices.

In FIG. 7, reference numerals 11-1, 11-2, 11-3, and 11-4 denote the video signal input terminals to which video signals a4-1, a41-2, a4-3, and a4-4 generated from e.g., four four-part split screens are lead. The video signals a4-1, a4-2, a4-3, and a4-4 on the video signal input terminals 11-1, 11-2, 11-3, and 11-4 are supplied to A/D converters 12-1, 12-2, 12-3, and 12-4, respectively. The A/D converters 12-1, 12-2, 12-3, and 12-4 convert the analog video signals a4-1, a4-2, a4-3, and a4-4 assigned for four-part split screens associated with video image display devices 18-1, 18-2, 18-3 and 18-4 to digital video signals b4-1, b4-2, b4-3, and b4-4. Then, the digital video signals b4-1, b4-2, b4-3, and b4-4 of the first through the fourth screens are supplied to inserters 13-1, 13-2, 13-3, and 13-4.

On the other hand, the detector 74 supplies a digital test pulse d4 whose signal level is controlled to the switch 75 based on a control signal c41 from a controller 80. The test pulse generator 74 outputs the digital test pulse d4 for four horizontal retrace line interval in the vertical scanning period. For inserting the detection pulses on different positions shifted by the horizontal scanning periods for the video signals of four-part split screens based on a control signal c42 from the controller 70, the switch 75 switches the digital test pulse d4s by turn in steps of the horizontal scanning period to supply them to the inserters 13-1, 13-2, 13-3, and 13-4 as digital test pulses d4-1, d4-2, d4-3, and d4-4.

The inserters 13-1, 13-2, 13-3, and 13-4 insert the digital test pulses d4-1, d4-2, d4-3, and d4-4 from the test pulse generator 74 on a predetermined positions of the digital video signals b4-1, b4-2, b4-3, and b4-4 from the A/D converters 12-1, 12-2, 12-3, and 12-4, and lead them to the level correctors 15-1, 15-2, 15-3, and 15-4 for the four-part split screens as digital video signals e4-1, e4-2, e4-3, and e4-4.

The level correctors 15-1, 15-2, 15-3, and 15-4, which are for instance the high speed volatile memory, output the correction value setup according to the values of input digital video signals e4-1, e4-2, e4-3, and e4-4. That is, the level correctors 15-1, 15-2, 15-3, and 15-4 are able to revise the correction values based on control signals f4-1, f4-2, f4-3, and f4-4 from the controller 80 to correct the levels of the digital video signals e4-1, e4-2, e4-3, and e4-4 from the inserters 13-1, 13-2, 13-3, and 13-4. Then they supply the corrected signals to D/A converters 16-1, 16-2, 16-3, and 16-4 as digital video signals g4-1, g4-2, g4-3, and g4-4.

The D/A converters 16-1, 16-2, 16-3, and 16-4 convert the digital video signals g4-1, g4-2, g4-3, and g4-4 from the level correctors 15-1, 15-2, 15-3, and 15-4 to analog video signals h4-1, h4-2, h4-3, and h4-4. The analog video signals h4-1, h4-2, h4-3, and h4-4 are then supplied to video image display device drivers 17-1, 17-2, 17-3, and 17-4.

The video image display device drivers 17-1, 17-2, 17-3, and 17-4 drive the video image display devices 17-1, 17-2, 17-3, and 17-4 by the supplied analog video signals h4-1, h4-2, h4-3, and h4-4, and supply the analog video signals h4-1, h4-2, h4-3, and h4-4 to the video image display devices 18-1, 18-2, 18-3, and 18-4.

The video image display devices 18-1, 18-2, 18-3, and 18-4 display the images of the analog video signals h4-1, h4-2, h4-3, and h4-4 on the first through fourth screens by the driving in the video image display device drivers 17-1, 17-2, 17-3, and 17-4.

Brightness information detectors 21-1, 21-2, 21-3, and 21-4 detect the brightness of the test pulse's image displayed by the video image display device 18. Then they convert brightness information signals i4-1, i4-2, i4-3, and i4-4 which are the detected results, and supply them to the switch 76.

The switch 76 selects the brightness information signals i4-1, i4-2, i4-3, and i4-4 from the first through fourth screens on the video image display device in the order of the inserted test pulses in steps of the horizontal scanning period, based on a control signal q4 from the controller 80 and supplies the selected signal to the I/F 82 as a brightness information signal i4. The I/F 82 converts the brightness information signal i4 into a voltage fashion, i.e., a voltage signal V4, and supplies it to the A/D converter 83. The A/D converter 83, which is controlled by a control signal j4 from the controller 80, generates a digital brightness information signal k4 by the A/D conversion of the voltage signal V4 supplied from the I/F 82, and supply the digital brightness information signal k4 to the comparator 84.

In this case, the controller 80 controls the A/D converter 83 by the control signal j4 to convert only the cathode current which the test pulse on the first through fourth screens inserted in the vertical retrace line interval drive the video image display device.

The digital brightness information signal k4 from the A/D converter 83 is supplied to the comparator 64.

The benchmark memory 85, wherein a plurality of benchmarks pertinent to test pulses of a plurality of levels including the intermediate levels for the first through fourth display screens are stored, provides therefrom a benchmark data n4 based on a read control signal m4 from the controller 80 and supply them to the comparator 84.

The comparator 84 compares the digital brightness information signal k4 from the A/D converter 83 and the benchmark data n4 from the benchmark memory 85, and supplies a comparison result p4 to the controller 80.

The controller 80 controls the test pulse generator 74 to output the number of levels of the digital test pulses on the first through fourth screens including the intermediate level by supplying the control signal c41 to the test pulse generator 74. The controller 80 also controls the switch 75 to divide the digital test pulse d4s of a number of levels on the first through fourth screens in these first through fourth screens and to supply them to the inserters 13-1, 13-2, 13-3, and 13-4 as the digital test pulses d4-1, d4-2, d4-3, and d4-4 by supplying the control signal c42 to the switch 75. The controller 80 then controls the switch 76 at the timing that the signal levels of the test pulse generated in the test pulse generator 74 are detected in the brightness information detectors 21-1, 21-2, 21-3, and 21-4 to be output as the brightness information signals i4-1, i4-2, i4-3, and i4-4. Furthermore the controller 80 supplies the control signal j4 for controlling the A/D converter 83 to perform the A/D conversion to the benchmark memory 85, at the same time it supplies the read control signal m4 to the benchmark memory 85 to control it to output the benchmark data pertinent to the test pulse supplied from the test pulse generator 74. Accordingly, the controller 80 supplies the control signal f4-1, f4-2, f4-3, and f4-4 for revising the correction values to the level correctors 15-1, 15-2, 15-3, and 15-4, in the case that to data signal p4 obtained from the comparator 84 show the differences.

According to the configuration as mentioned above, the automatic brightness correction apparatus, as shown in FIG. 7, is provided with a number of video image display devices 18-1, 8-2, 18-3 and 18-4, a number of brightness information detectors 21-2, 21-2, 21-3, and 21-4, and the switch 76 for switching the brightness information signals detected in the brightness detectors, so as to control the second A/D converter 83, the benchmark selector such as the controller 80, the comparator 84, and the correction value revisor such as the controller 80 in timeshared fashion in response to the number of video signals to be displayed on the video image display devices 18-1, 18-2, 18-3 and 18-4, respectively.

In the multi-screen display device using a number of video image display devices as described above, the operations are the same as the embodiment, as shown in FIG. 3, so as to selectively operate four systems using the switches 75 and 76. If a number of switches as much as the number of display devices are provided, the same operation becomes available for more than four systems.

In the case of the multi-CRT display device, since the images in the video image display devices which are next to can be compared these are recognized easily even there are some brightness differences. While the embodiment of the present invention which performs the excellent brightness correction over full levels including the intermediate level is highly effective.

Figure 8:
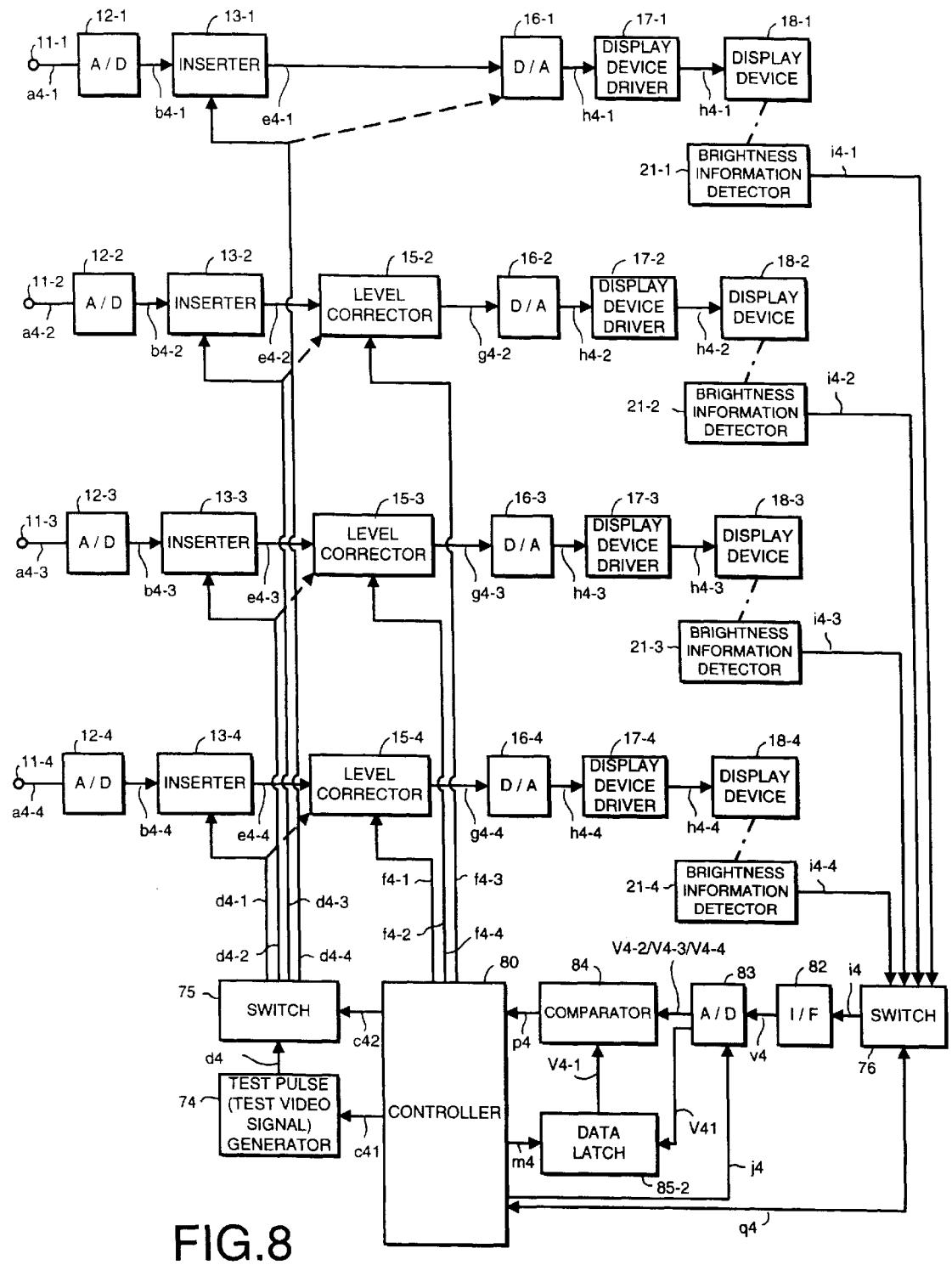
FIG. 8 is a block diagram showing a modification of the embodiment, as shown in FIG. 7.

Referring now to FIG. 8, a modification which allows degradations of brightness properties of respective CRTs in a multi-CRT type image display device, but eliminates only the brightness unbalance among those CRTs, by taking, for example, the brightness information signal i4-1 as a benchmark. In FIG. 8, the controller 80 controls a data latch 85-2 to latch only the brightness information signal i4-1 supplied from A/D converter 83. The comparator 84 compares three other brightness information signals i4-2, i4-3 and i4-4 with the brightness information signal i4-1 latched as the benchmark in the data latch 85-2. Then the controller 80 controls the revisions of correction levels in the level correctors 15-2, 15-3 and 15-4 in the manner the same as that in the embodiment of FIG. 7, based on these comparison results. Then color signals to be supplied to the CRTs 18-2, 18-3 and 18-4 are so controlled that their brightness levels coincide with the color signal supplied to the CRT 18-1. And thus all of the CRTs 18-1, 18-2, 18-3 and 18-4 become to exhibit the same brightness property. According to the above embodiment, the first channel assigned to the CRT 18-1 does not need a level corrector. As described above, in such a multi-CRT type image display device which is enough to eliminate only the brightness unbalance among a plurality of CRTs, it is also able to provide a favorable image display free from the brightness unbalance of the CRTs in extending over the whole level range including the intermediate level, if removing the benchmark memory and one of the level correctors.

Figure 9:
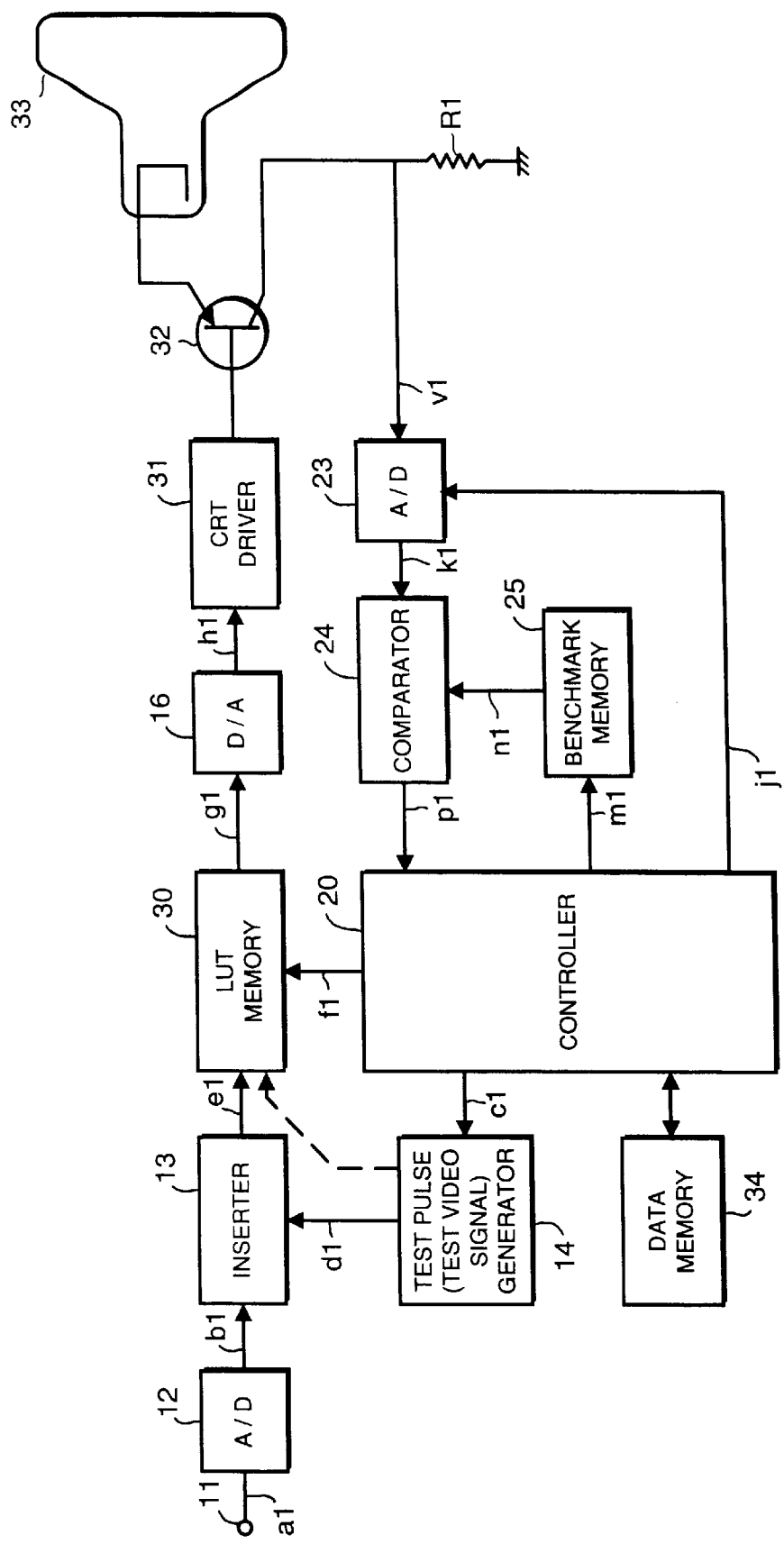
FIG. 9 is a block diagram showing the fourth embodiment of the automatic brightness correction apparatus according to the present invention.

FIG. 9 is a block diagram showing the fourth embodiment of the present invention, and the same components as those, as shown in FIG. 2 are assigned with the same reference numerals.

In FIG. 9, the difference from the embodiment of the present invention, as shown in FIG. 2, is that an inverse gamma corrector 35 is added to before the A/D converter 23.

Figure 10A:
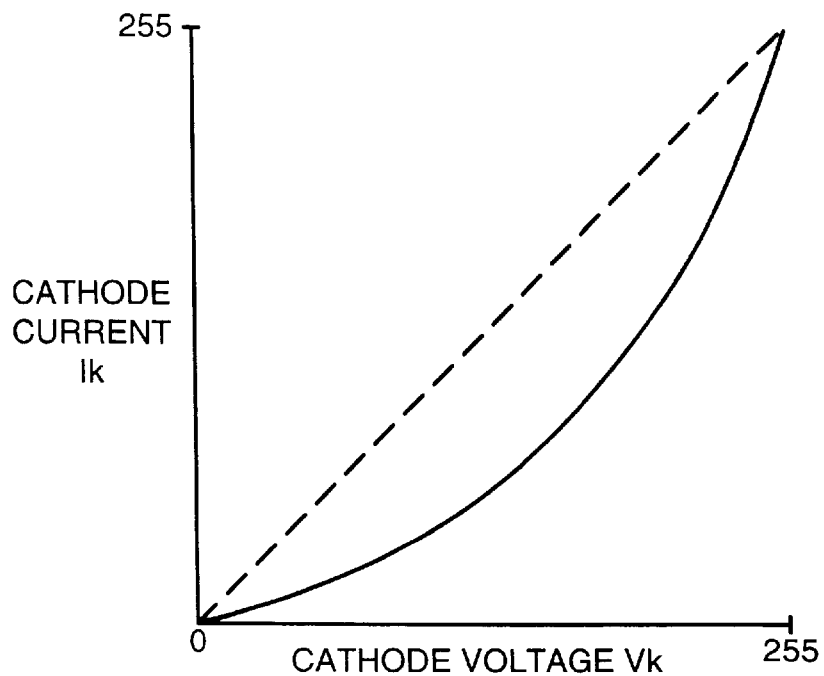
FIG. 10 is a diagram explaining the operation of the inverse gamma corrector shown in FIG. 9.
Figure 10B:
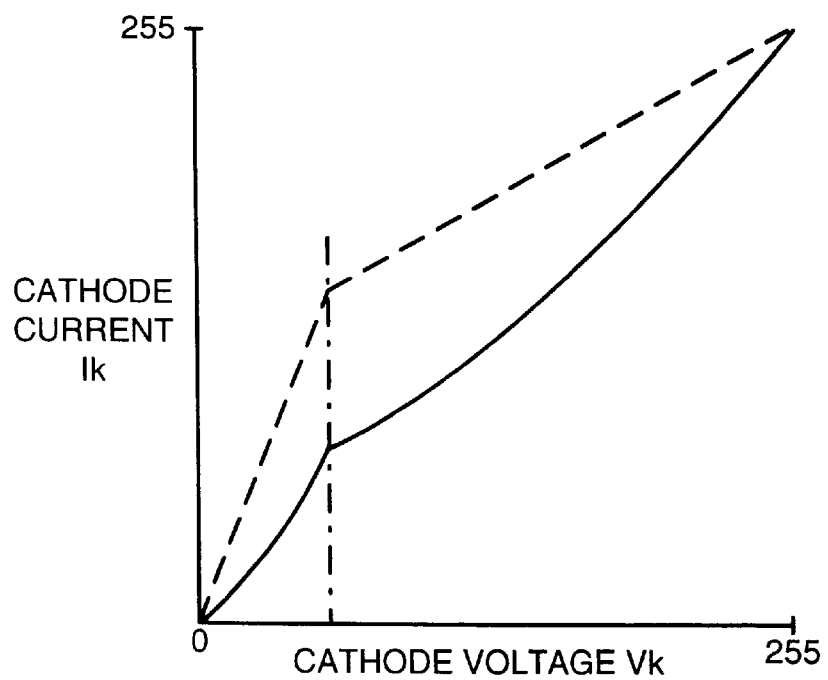

According to such a construction in the embodiment of the present invention, the brightness information signal corrector (inverse gamma corrector 35) for correcting the inverse gamma characteristics of the brightness information signal according to the detection level is defined on the way to supply the brightness information signal from the brightness information detector (cathode current detection transistor 32, and resistor R1) to the second A/D converter 23. FIG. 10 is explaining the operation of the inverse gamma corrector 35. FIG. 10a is showing the graph of the cathode current Ik and the cathode input voltage Vk detected in the A/D converter 23 in the case that the inverse gamma corrector 35 is ineffective. FIG. 10b is showing the graph of the cathode current Ik and the cathode input voltage Vk detected in the A/D converter 23 in the case that the inverse gamma corrector 35 is effective.

In the general CRT the cathode input voltage Vk to the cathode current Ik (brightness) has a gamma characteristic as expressed by the solid line graph, as shown in FIG. 10a.

The gamma characteristic in this case will be given by the following Equation 1.

$$IK = K \times Vk^\gamma \quad (1)$$

In the Equation 1, γ has a value about 2.2~2.8.

In the case that the resolutions of the A/D converter 12 and the A/D converter 23 is 8 bits, the test pulse is the signal variable from 0 to 255 in digital level as the same way of the embodiment of the present invention in FIG. 2, the data in the LUT memory 30 is not corrected, and the cathode input voltage Vk of the test pulse and the cathode current Ik (in this case it corresponds to the voltage signal by the corrector resistor R1) are 0 to 255 in digital level for convenience, the change of the cathode input voltage Vk will be the same as the change of the cathode current Ik as expressed by the broken line graph, as shown in FIG. 10a. However, in the gamma characteristic as expressed by the solid line graph, as shown in FIG. 10a, the cathode current Ik does not revise for 1 in digital level even if the cathode input voltage Vk revises for 1 in digital level in the part whose gradient is more gentle than the gradient of the broken line graph like the smaller value parts of the cathode input voltage Vk. On the other way, the cathode current Ik revises more than 1 in digital level even if the cathode input voltage Vk revises by 1 in digital level on the parts whose gradient is steeper than the gradient of the broken line like the greater value parts of the cathode input voltage Vk. There is no problem when the cathode current Ik revises more than 1 in digital level at the time the cathode input voltage Vk revises by 1 in digital level. However, it causes a problem that the cathode current Ik does not revise even when the cathode input voltage Vk revises by 1 digital level. The reason of the problem is that the more the number of the step of the test pulse are the more the detection number will be, and the fine brightness correction must be performed, however, what the detection value does not revise even the test pulse is revised means the decrease number of the detection and the roughness of correction.

As a measure for overcoming the problem mentioned above, there is a method to promote the resolution of the A/D converter 23 in the brightness information detector. However, most general-purpose components used for conventional circuits are not more than 10 bit, and the parts that are more than 10 bit is expensive and less various. Further, since the brightness information detector is around the high-voltage circuit (cathode) it is easy to generate the noise, so that it does not get a good effect because of the noise even promoting the resolution.

So, in the embodiment of the present invention, the fine adjusting can be performed without promoting the resolution of the A/D converter 23 by correcting the signals in the inverse gamma corrector 35. The inverse gamma corrector 35 can make the correction characteristic as expressed by the one-knot polygonal graph, as shown in FIG. 10a. Accordingly, the voltage signal by the cathode current Ik input to the A/D converter 23 is corrected to the characteristic shown with a solid line graph in FIG. 10b. As is apparent from the solid line graph, the smaller value part of the cathode input voltage Vk has a steeper gradient, thus very close to the broken line graph, as shown in FIG. 10a. Accordingly, the fine correction as much as the number of the steps of the test pulse can be performed without promoting the resolution of the A/D converter 23. As a matter of course, if the inverse gamma corrector 35 is revised to the circuits such as one having a polygonal characteristics, or the one having a non-linear characteristics, more fine correction can be possible.

Figure 11:
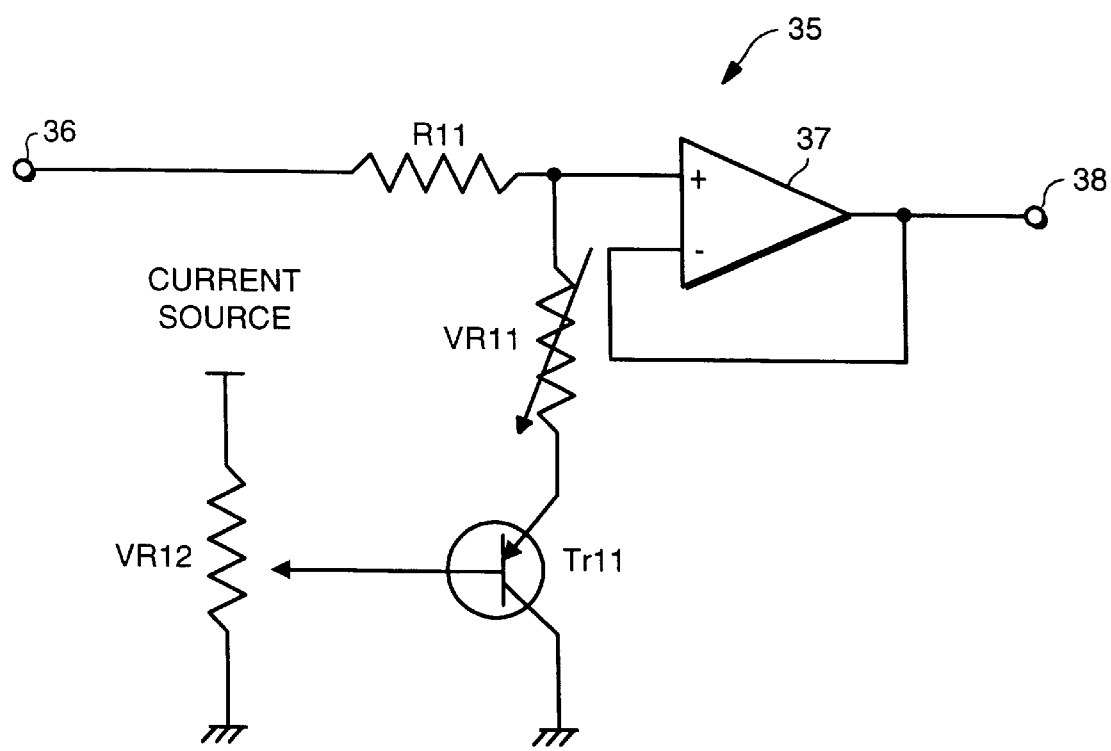
FIG. 11 is a circuit diagram showing an example of the inverse gamma corrector shown in FIG. 9.

FIG. 11 is a circuit showing one example of the inverse gamma corrector 35 shown in FIG. 9. In FIG. 11, a reference numeral 36 denotes an input terminal of the inverse gamma corrector 35 connected to the connection of the cathode current detection transistor 32 and the corrector resistor. The input terminal 36 is connected to the non-inverse input terminal (+) of a differential amplifier 37 via the resistor R11. The connecting point of the resistor R11 and non-inverse input terminal (+) of the differential amplifier 37 is connected to the reference potential source via the series connection of the emitter corrector of a PNP transistor Tr11 and a variable resistor VR11. The base of the PNP transistor Tr11 is connected to the moving contact of a variable resistor VR12. One end of the variable resistor VR12 is connected to the electric power whose voltage is fixed, and the other end is connected to the reference potential source. The output terminal of the difference amplifier 37 is connected to the non-inverse input terminal (+), and also to an output terminal 38. The output terminal 38, which is the output terminal of the inverse gamma corrector 35, is connected to the A/D converter 23.

According to such a construction mentioned above, the inverse gamma corrector 35 shown in FIG. 9 can be realized.

In the embodiment of the present invention shown in FIG. 9, it is mentioned that a fine correction can be performed, if provided a number of detection samples the same as the size of the revising step of the detecting signal. This means that the revising step of the test pulse is defined to the size necessary to perform a fine correction. While if the revising step of the test pulse has the size the same as the detection samples, it cannot such a fine correction. In other words, the number of the detection samples has a key role, and thus it is enough to have a number of detection samples required to perform the fine correction.

So, the following method is considered that it detects the test pulse which is revised more than two steps at once, and get the necessary final detection numbers by operating the detection value of the skipped steps. The system will be shown in FIG. 12.

Figure 12:
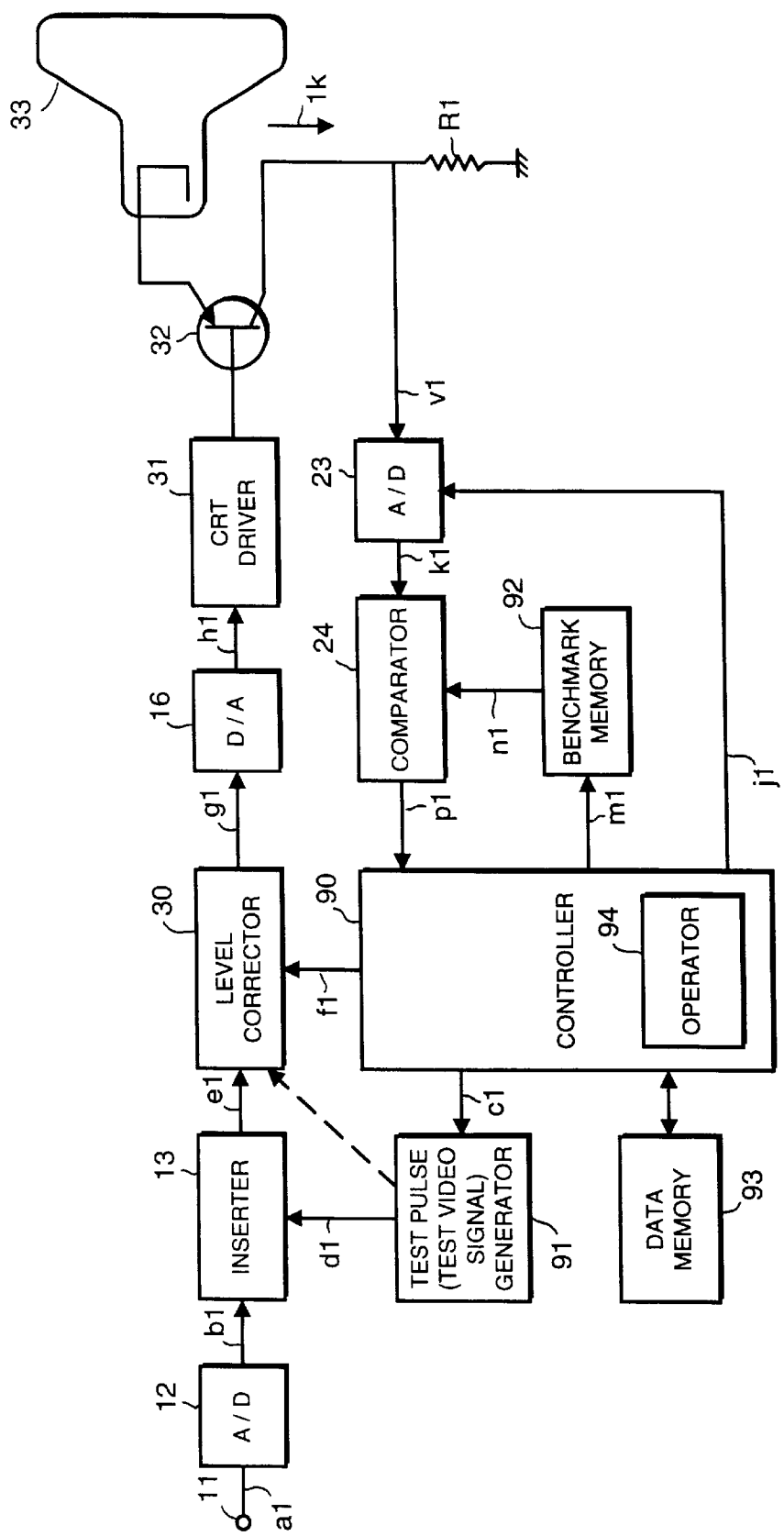
FIG. 12 is a block diagram showing fifth embodiment of the automatic brightness correction apparatus according to the present invention.

FIG. 12 is a block diagram showing the fifth embodiment of the automatic brightness correction apparatus according to the present invention. In FIG. 12 the same components as those shown in FIG. 2 are assigned with the same reference numerals.

In FIG. 12, the parts different from the embodiment of the present invention are a controller 90, a test pulse generator 91, a benchmark memory 92, and a data memory 93.

While the level of the pulse generated in the test pulse generator 91, which varies from 0 to 255 in digital level the same as the test pulse generator 14, as shown in FIG. 2, it varies by twos such as 0, 2, 4, 6, . . . 244, 0, 2, . . . in every vertical scanning period. The inserter 13, the LUT memory 30, the D/A converter 16, the CRT driver 31, the cathode current detection transistor 32, and the resistor R1 perform the same operations as those shown in FIG. 2 in order to supply the voltage signal V1 by the cathode current Ik to the A/D converter 23. The voltage signal V1 by the cathode current Ik is performed the digital conversion in the A/D converter 23, and compared in the comparator 24. Here, since the number of the test pulses are as half as that of the embodiment of the present invention shown in FIG. 2, the benchmark memory 92 may record half of data compared with the benchmark memory 25 shown in FIG. 2. Then the controller 90 revises the value of the level corrector 90 in the same as the embodiment shown in FIG. 1 based on the comparison result of the comparator 24, however, since it revises the value as half as that of the level corrector 30, the rest half can be performed by the built-in operator.

The operation in the operator 94 will be explained below.

When the test pulse has a value 2N (N=0, 1, 2, 3, . . . , 127), the controller 90 reads out a value pertinent to the test pulse value 2N from the data memory 93 based on the comparison result in the same way as the embodiment shown in FIG. 2 so as to vary the value. Then it writes the value into the data memory 93, and revises the value of the LUT memory 30 at the same time. In the embodiment shown in FIG. 2 the revision of the correction values in the LUT memory 30 has been carried out in the vertical scanning period. In the embodiment of the present invention, it is carried out in, for example, a half of the vertical scanning periods. Accordingly, the controller 90 reads out the values pertinent to the test pulse value 2N and the test pulse value 2 (N-1) from the data memory 93 after a half of the vertical scanning period. Then the operator 94 calculates a value pertinent to the test pulse value 2N-1 from two values read out from the data memory 93, so as to rewrite the address corresponding to the LUT memory 30 with the calculated value. The above operation can be performed just simply by averaging these two value, or performed the complicated correction operation from more than two values. Further, the operation result may be stored without modifying the LUT memory 30 in the half of the vertical scanning period intervals so as to revise the two LUT memories 30 in every vertical scanning period.

The levels of the test pulse are revised by 2 in digital level in the vertical scanning period such as 0, 4, 6, . . . , 244, 0, 2, . . . in the embodiment mentioned above, however, the intervals of the test pulse may be arbitrarily defined. Further, there is no need that they are the same interval. For instance, in the case of CRT, which has the gamma characteristic as explained in FIG. 10, the test pulse will be effective which adjust to the gamma characteristic such as when the cathode current Ik is small (the test pulse is small) it increases by one like 0, 1, 2, 3, . . . , when the cathode current Ik is in an intermediate value (the test pulse has an intermediate level) it increases by threes like 100, 103, 106, . . . , and when the cathode current Ik is big (test pulse is big(it increases by fives like 200, 205, 210, . . . . At that time, the benchmark memory 92 and the data memory 93 must be arranged with the values pertinent to the test pulse.

According to such a construction mentioned above, in the embodiment shown in FIG. 12 it is provided with the correction value operator (operator 94) which operates the correction value of the level corrector (LUT memory 30) from the correction value operated from the comparison result in the comparator 24.

In the embodiment as mentioned above, it can get the same effect as the embodiment shown in FIG. 2, at the same time it decreases the data stored in the benchmark memory 92 and the data memory 93. In the case of the multi screen display device mentioned in FIG. 7, although a plurality of benchmark memories and data memories are required by the amount of video image display devices and thus the amount of data also increases, the embodiment of the present invention can decrease a substantial amount of data. Further, since the steps of the test pulse decreases, a detection cycle can be cut down.

Figure 13:
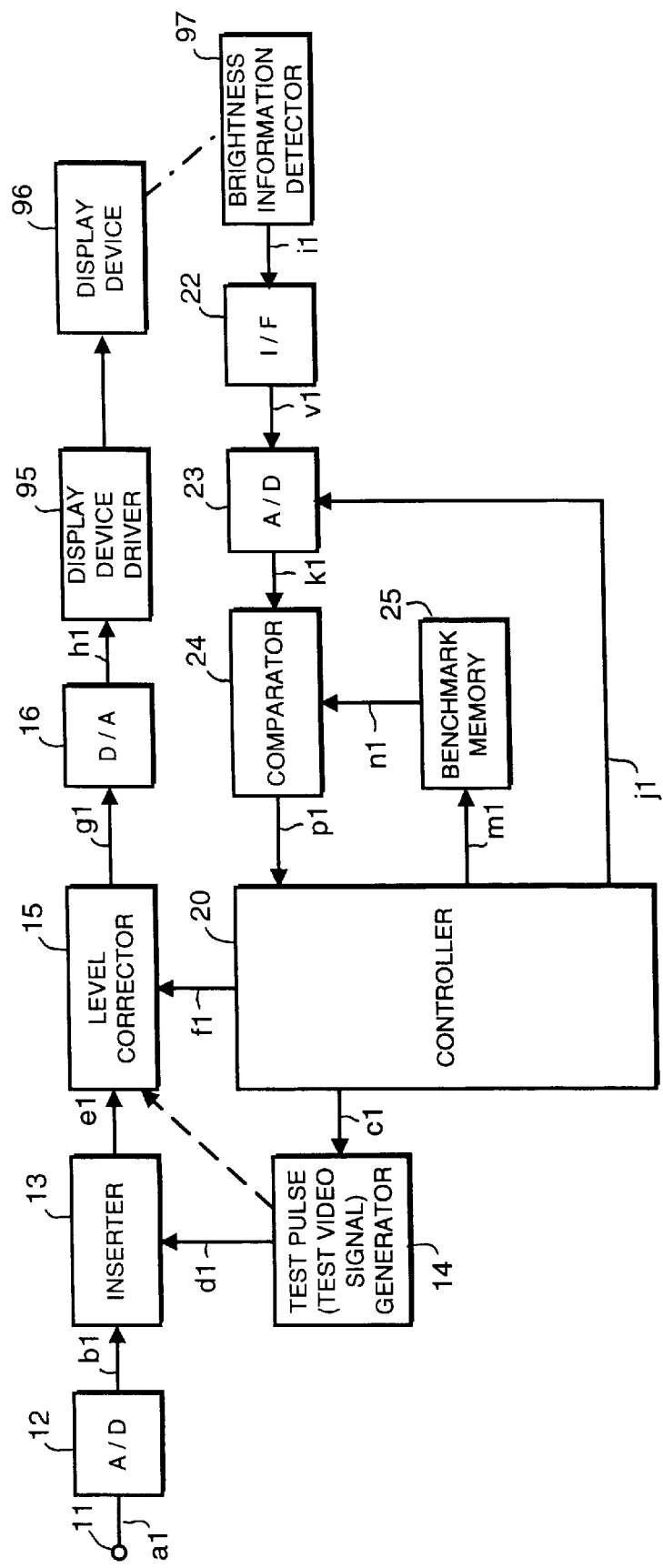
FIG. 13 is a block diagram showing sixth embodiment of the automatic brightness correction apparatus according to the present invention

FIG. 13 is a block diagram showing that the sixth embodiment of the automatic brightness correction apparatus according to the present invention is applied to the display device. In FIG. 13 the same components as those shown in FIG. 1 are assigned with the same reference numerals.

In FIG. 13, the embodiment of the present invention is provided with the video image display device driver 17, the video image display device 18, the brightness information detector 21, which are shown in FIG. 1, and LCD (liquid crystal display) driver 95, an LCD device 96 and a brightness detection optical sensor 97.

The LCD driver 95 drives the LCD device 96 by the supplied analog video signal h1, so as to display the analog video signal h1 on the LCD device 96.

The LCD device 96 displays the analog video signal h1 on the LCD screen by the LCD driver 95.

The brightness detection optical sensor 97 detects the brightness of the video image displayed by the LCD device 96, and converts it to the brightness information signal l1 which is the detection result, so as to supply it to the I/F 22.

Figure 14:
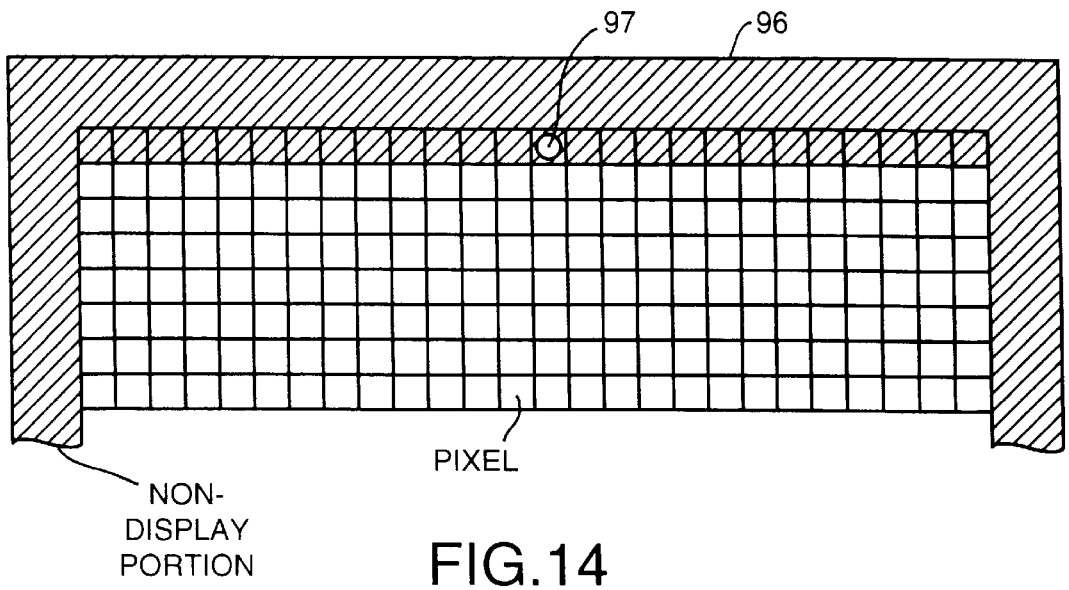
FIG. 14 is a diagram showing an LCD device whereon a brightness detection optical sensor as shown in FIG. 13 is installed.

FIG. 14 is a diagram illustrating the position for mounting the brightness detection optical sensor 97 shown in FIG. 13.

In FIG. 14, one horizontal pixel row at the top end of the LCD device 96 is left deactivated and assigned for detecting brightness detection pixel to be non display. Then, the brightness detection optical sensor 97 such as a photodiode is placed on an arbitrary position in the pixel row. Then in the same way as the CRT, the test pulse of the horizontal scanning period is inserted on the position corresponding to the horizontal pixel row so that the brightness of the test pulse is measured by the brightness detection optical sensor 97. As shown in FIG. 13, the output signal from the brightness detection optical sensor 97 is converted into the proper voltage via the I/F 22 so as to be input to the A/D converter 23. Other operations are the same as that of the embodiment 1 of the present invention.

Further, in the general color LCD, since the R, G and B color pixels are aligned in the horizontal direction, the color balance among the R, G and B colors can be maintained in the same way as that shown in FIG. 3 if three brightness detection optical sensors are located in facing with the R, G and B color pixels so as to monitor the brightness levels of the R, G and B color pixels.

According to the embodiment mentioned above, the same effect as that of the CRT can be also obtained in the embodiment of the LCD. Further, even in the display device but the LCD, if it can set the brightness sensor it can have the same effect. Furthermore, the present invention can be applied to the video image display device, if the apparatus has the signals of variable levels according to the brightness such as the cathode current of the CRT.

Figure 15:
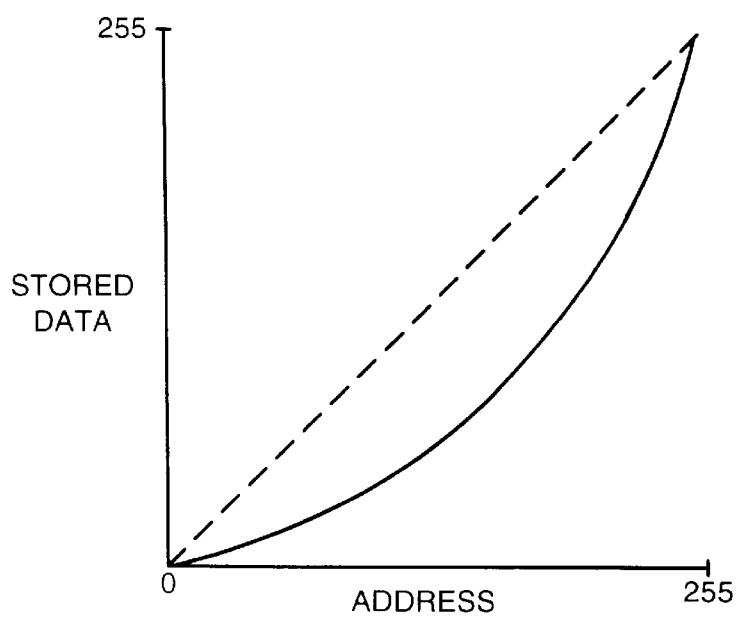
FIG. 15 is a graph showing the one example of the benchmark stored in the level corrector shown in FIG. 13.

FIG. 15 is a graph showing one example of the benchmark stored in the level corrector shown in FIG. 13, where the horizontal coordinate axis presents the address and the vertical coordinate axis presents the stored data.

Generally, in the NTSC broadcasting, it is performed the inverse gamma correction at the broadcasting side to adjust to the CRT gamma distortion. In the case to display such a signal in the display device excepting the CRT, the gamma corrector is defined so that the gamma distortion is corrected to be the original linear video signal.

However, in the embodiment of the present invention shown in FIG. 13, if the benchmark stored in the benchmark memory 25 has the gamma characteristic as expressed by the solid line graph, as shown in FIG. 15, the gamma correction can be performed without defining the gamma circuit anew.

As mentioned above, since the value of the level corrector (LUT memory) will ultimately become equal to the benchmark of the brightness information signal, the data in the level corrector will have the gamma characteristic as expressed by the solid line graph shown in FIG. 15 if the benchmark has the gamma character. Then since the video signal is input to the address terminal of the level corrector in order to output the data stored at the address, the video signal can be performed the gamma correction if the level corrector has the characteristic as expressed by the solid line graph, as shown in FIG. 15.

Figure 16:
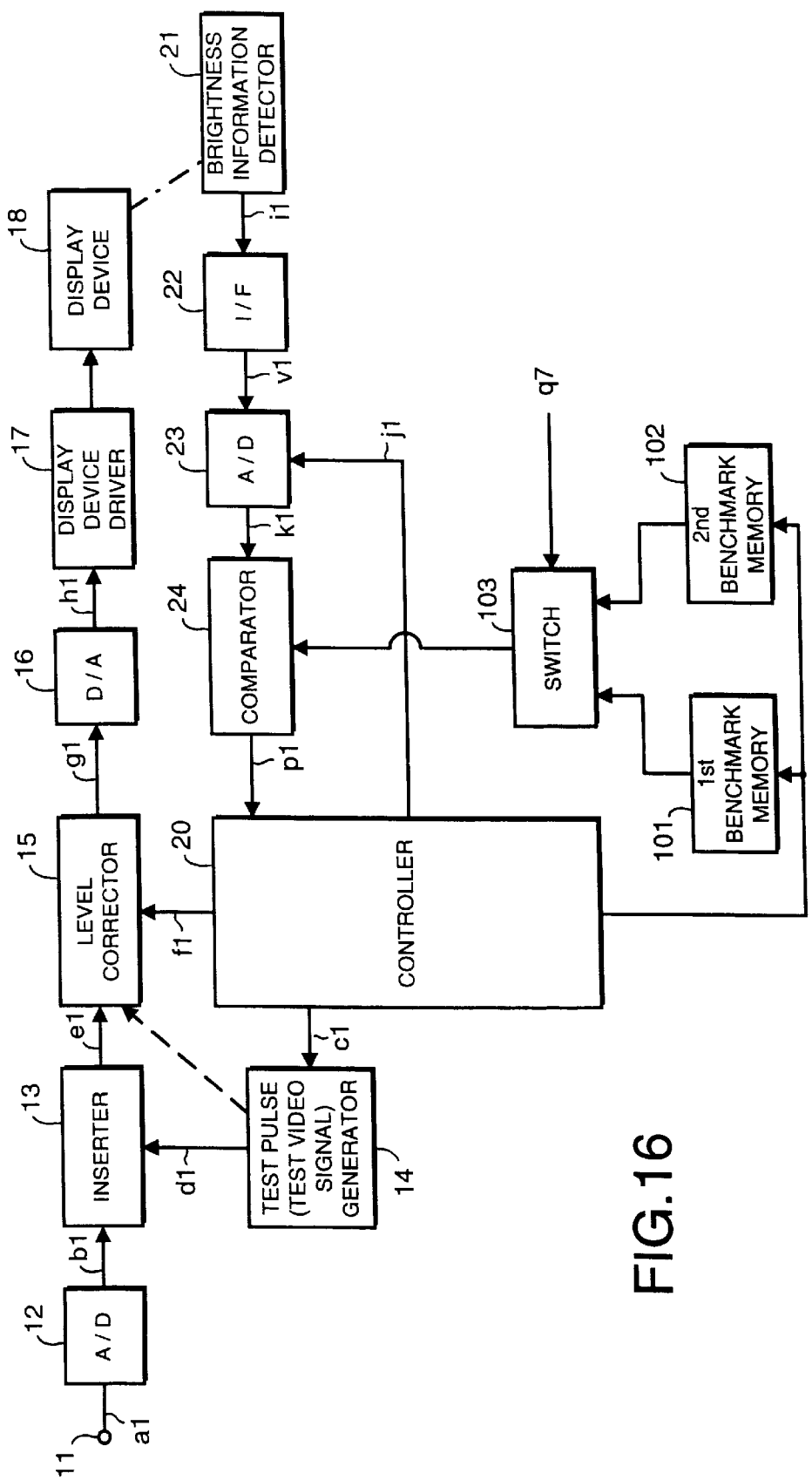
FIG. 16 is a block diagram showing the seventh embodiment of the automatic brightness correction apparatus according to the present invention.

FIG. 16 is a block diagram showing the seventh embodiment of the automatic brightness correction apparatus according to the present invention. In FIG. 16, the same components as those shown in FIG. 1 are assigned with same reference numerals.

In FIG. 16, the embodiment of the present invention is provided with first and the second benchmark memories 101 and 102. Then a switch 103 revises one of the first and the second benchmark memories 101 and 102 to connect it to the comparator 24.

According to the construction mentioned above, the embodiment of the present invention is provided with a number of benchmark memories (the first and the second benchmark memories 101 and 102), so as to revise them according to the input analog video signal.

For instance, the first benchmark memory 101 stores the benchmark having the correction characteristic which can perform the display suitable for the NTSC broadcasting display time. The second benchmark memory 102 sets up the benchmark not having the correction characteristic which can perform the display suitable for personal computer signal to be revised in the switch 103 controlled by the revising signal q7 supplied from the video signal system discriminator (not shown). Accordingly, the suitable video display can be performed by using the first benchmark 101 at the NTSC time, and using the second benchmark memory 102 at the personal computer signal. Of course, the more the benchmark memories are increased, the more video signal it corresponds to. So, the it can perform the suitable video display all the time regardless of the difference of the input video signals, and also it prevent the brightness revise caused by the passage of time.

In the above embodiments, a base-band video signal is received from a television receiver tuner/demodulator or a video tape recorder, and then a test pulse is inserted to the specific position of the video signal. However the present invention is also available by a modification without the use of video signals received from outside Sources. That is, it is possible to generate a base-band test video signal in place of the test pulse and directly supply the test video signal itself into the level corrector 15 or the LUT memory 30 etc., as illustrated by broken lines in FIGS. 1–3, 6–9, 12, 13 and 16. Then this modification is also able to automatically correct brightness properties of image display devices.

As mentioned above, since it can perform the excellent automatic brightness correction to the video signal of intermediate levels, it can perform the excellent brightness correction at all levels including the intermediate level which have not been performed in the conventional apparatus. So, it can prevent the revises of the brightness or the white balance (R, G and B colors balance) at all brightness levels with the passage of time. Further, it can also prevent the brightness difference between the CRT in the multi-screen display device with the passage of time and can display the fine pictorial quality all the time. Furthermore, since it can perform the correction (gamma correction) to the video signal by the correction characteristic suitable for the display devices and the correction characteristic can be revised easily to the input video signals, it is perform the fine video display all the time.

As described above, the present invention can provide an extremely preferable automatic brightness correction apparatus for automatically corrects the brightness property of the image display device.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purpose of a divisional application.

What is claimed is:

1. An automatic brightness correction apparatus for automatically correcting the brightness property of an image display device, comprising:

a test video signal generator for generating a test video signal at a predetermined level;

a level corrector for correcting the level of the test video signal generated by the test video signal generator by using a correction signal pertinent to the signal level;

an image display device for displaying the test video signal corrected the level by the level corrector;

a brightness information detector for detecting brightness information of the test video signal displayed on the image display device;

a benchmark memory for storing benchmarks;

a benchmark selector for selecting a benchmark pertinent to the brightness information signal from the benchmark memory;

a comparator for comparing the brightness information signal detected by the brightness information detector and the benchmark selected by the benchmark selector; and a controller for controlling the level corrector to revise the correction data pertinent to the signal level of the test video signal in the level corrector based on the comparison result provided from the comparator.

2. An automatic brightness corrections apparatus as claimed in claim 1, wherein:

the test video signal generator is configured to generate a test video signal at a level variable over a level range including an intermediate level;

the benchmark memory is configured to store a plurality of benchmarks pertinent to the level range of the test video signal;

and the automatic brightness correction apparatus further comprising a selector for selecting a predetermined level of test video signal and a benchmark pertinent to the level of the test video signal; and the comparator is configured to compare the brightness information signal detected by the brightness information detector and the benchmark selected by the benchmark selector.

3. An automatic brightness correction apparatus as claimed in claim 1, characterized by that it is further configured to:

provide in parallel a plurality of image display devices;

connect a plurality of brightness information detectors to the plurality of image display devices, respectively;

provide a switch for switching brightness information signals detected by the plurality of brightness information detectors; and carry out the difference determination and the revision of the correction level in a timeshared fashion in response to a plurality of test pulses to be displayed on the plurality of image display devices.

4. An automatic brightness correction apparatus for automatically correcting the brightness property of an image display device, comprising:

a video signal receiving circuit;

a test pulse generator for generating a test pulse at a predetermined level;

an inserter for inserting the test pulse generated by the test pulse generator into the video signal provided from the video signal receiving circuit;

a level corrector for correcting the level of a composite video signal provided from the inserter by using a correction signal pertinent to the level of the test pulse in the composite video signal;

an image display device for displaying the composite video signal corrected by the level corrector;

a brightness information detector for detecting brightness information of the composite video signal displayed on the image display device;

a benchmark memory for storing benchmarks pertinent to a plurality of levels of the test pulse;

a benchmark selector for selecting a benchmark pertinent to the brightness information signal from the benchmark memory;

a comparator for comparing the brightness information signal detected by the brightness information detector and the benchmark selected by the benchmark selector, and a controller for controlling the level corrector to revise the correction data pertinent to the signal level of the test pulse in the level corrector based on the comparison result provided from the comparator.

5. An automatic brightness correction apparatus as claimed in claims 4; wherein:

the test pulse generator is configured to generate a test pulse at a level variable over a level range including an intermediate level;

the benchmark memory is configured to store a plurality of benchmarks pertinent to the plurality of levels of the test pulse;

and the automatic brightness correction apparatus further comprising a selector for selecting a predetermined level of test pulse and a benchmark pertinent to the level of the test pulse; and the comparator is configured to compare the brightness information signal detected by the brightness information detector and the benchmark selected by the benchmark selector.

6. An automatic brightness correction apparatus as claimed in claim 4, characterized by that it is further configured to:

provide in parallel a plurality of image display devices;

connect a plurality of brightness information detectors to the plurality of image display devices, respectively;

provide a switch for switching brightness information signals detected by the plurality of brightness information detectors; and carry out the difference determination and the revision of the correction level in a timeshared fashion in response to the plurality of test pulses to be displayed on the plurality of image display devices.

7. An automatic brightness corrections apparatus, comprising:

a first A/D converter for converting an input analog video signal into a digital video signal;

a test pulse generator for generating digital test pulse at a predetermined level within a level range including an intermediate level;

a test pulse inserter for inserting the digital test pulse supplied from the test pulse generator so that the test pulse is inserted to the video signal in the specific position of the digital video signal supplied from the first A/D converter, and for outputting the signal;

a level corrector for correcting the level of the digital video signal supplied from the test pulse inserter by the correcting value which corresponds to the level of the signal;

a D/A converter for converting the digital video signal supplied from the level corrector into the analog video signal;

a brightness information detector for detecting the brightness of an video image display device which is driven by the test pulse supplied from the D/A converter, and outputting a brightness information signal of the detection result;

a second A/D converter for converting the brightness information signal supplied from the brightness information detector into the digital brightness information signal;

a benchmark memory for storing a number of benchmarks;

a benchmark selector for selectively reading out a benchmark pertinent to the test pulse from the benchmark memory;

a comparator for comparing the digital brightness information signal from the second A/D converter and the benchmark selected by the benchmark selector; and a controller for controlling the level corrector to revise the correction data pertinent to the signal level of the test pulse in the level corrector based on the comparison result provided from the comparator.

8. An automatic brightness correction apparatus as claimed in claim 7; wherein:

the test pulse generator is configured to generate a test pulse at a level variable over a level range including an intermediate level;

the benchmark memory is configured to store a plurality of benchmarks pertinent to the plurality of levels of the test pulse;

and the automatic brightness correction apparatus further comprising a selector for selecting a predetermined level of test pulse and a benchmark to the level of the test pulse; and the comparator is configured to compare the brightness information signal detected by the brightness information detector and the benchmark selected by the benchmark selector.

9. An automatic brightness correction apparatus as claimed in claim 7, characterized by that it is further configured to:

provide in parallel a plurality of image display devices;

connect a plurality of brightness information detectors to the plurality of image display devices, respectively;

provide a switch for switching brightness information signals detected by the plurality of brightness information detectors; and carry out the second A/D converter, the benchmark selector, the comparator and the correction level revisor (controller) in a timeshared fashion in response to the plurality of test pulses to be displayed on the plurality of image display devices.

10. An automatic brightness correction apparatus claimed in claim 7, wherein the benchmark memory includes a plurality of memories which are selectively used in response to the type of the input analog video signal.

11. An automatic brightness correction apparatus for correcting brightness properties of a plurality of parallelly connected image display device, comprising:

a plurality of brightness information detectors for detecting each brightness information signals of the test image signals with predetermined levels displayed on the image display devices; and a switch for outputting brightness information signals detected by the plurality of brightness information detectors by successively switching the brightness information signals;

wherein it is characterized by that the apparatus determines differences of the brightness information signals of the image display devices output from the switch from benchmarks assigned previously for the brightness information signal, and then correct in a timeshared fashion the levels of the test video signals displayed on the corresponding image display devices based on the differences.

12. An automatic brightness correction apparatus as claimed in claim 11, wherein the test image signals are input image signals added with test pulses at predetermined levels.

* * * * *